(12) United States Patent
Wu et al.

(10) Patent No.: US 8,862,388 B2
(45) Date of Patent: Oct. 14, 2014

(54) APPARATUS, METHOD AND ARTICLE FOR PROVIDING LOCATIONS OF POWER STORAGE DEVICE COLLECTION, CHARGING AND DISTRIBUTION MACHINES

(75) Inventors: Yi-Tsung Wu, New Taipei (TW); Matthew Whiting Taylor, North Bend, WA (US); Hok-Sum Horace Luke, Mercer Island, WA (US); Jung-Hsiu Chen, Taoyuan (TW)

(73) Assignee: Gogoro, Inc., Guishan Township, Taoyuan County (TW)

( * ) Notice: Subject to any disclaimer, the term of this patent is extended or adjusted under 35 U.S.C. 154(b) by 0 days.

(21) Appl. No.: 13/559,333

(22) Filed: Jul. 26, 2012

(65) Prior Publication Data

US 2013/0030696 A1 Jan. 31, 2013

Related U.S. Application Data

(60) Provisional application No. 61/511,900, filed on Jul. 26, 2011, provisional application No. 61/647,936, (Continued)

(51) Int. Cl.
| | |
|---|---|
| B60L 11/00 | (2006.01) |
| G06Q 30/02 | (2012.01) |
| G06Q 30/06 | (2012.01) |
| H02J 7/00 | (2006.01) |
| H02J 4/00 | (2006.01) |
| G07C 5/00 | (2006.01) |
| G01C 21/34 | (2006.01) |
| E05B 81/56 | (2014.01) |
| H01M 10/42 | (2006.01) |

(52) U.S. Cl.
CPC ............... *E05B 81/56* (2013.01); *Y02T 90/161* (2013.01); *G06Q 30/0267* (2013.01); *Y02E 60/12* (2013.01); *Y02T 10/7005* (2013.01); *G06Q 30/0639* (2013.01); *H02J 7/007* (2013.01); *G06Q 30/0253* (2013.01); *H02J 4/00* (2013.01); *Y02T 10/7022* (2013.01); *G07C 5/00* (2013.01); *G01C 21/3476* (2013.01); *H01M 10/4257* (2013.01); *G06Q 30/0259* (2013.01); *Y02T 90/16* (2013.01); *H02J 7/00* (2013.01)
USPC ............................................. 701/425; 701/22

(58) Field of Classification Search
USPC ...................... 701/22, 36, 431, 409; 180/271; 705/412; 320/107, 109, 110, 112, 113
See application file for complete search history.

(56) References Cited

U.S. PATENT DOCUMENTS

| | | |
|---|---|---|
| 1,387,848 A | 8/1921 | Good |
| 4,087,895 A | 5/1978 | Etienne |

(Continued)

FOREIGN PATENT DOCUMENTS

| | | |
|---|---|---|
| EP | 0 693 813 A1 | 1/1996 |
| EP | 2 101 390 A2 | 9/2009 |

(Continued)

OTHER PUBLICATIONS

International Search Report and Written Opinion for corresponding European Patent Application No. PCT/US2012/048379, mailed Dec. 17, 2012, 9 pages.

(Continued)

*Primary Examiner* — Mary Cheung
*Assistant Examiner* — Rodney Butler
(74) *Attorney, Agent, or Firm* — Seed IP Law Group PLLC

(57) ABSTRACT

A network of collection, charging and distribution machines collect, charge and distribute portable electrical energy storage devices (e.g., batteries, supercapacitors or ultracapacitors). Locations of collection, charging and distribution machines having available charged portable electrical energy storage devices are communicated to or acquired by a mobile device of a user or a navigation system of a user's vehicle. The locations are indicated on a graphical user interface on a map relative to the user's current location. The user may select particular locations on the map to reserve an available portable electrical energy storage device at a particular collection, charging and distribution machine location. The collection, charging and distribution machine locations displayed may also be based on a physical distance or driving time from the current location of the user mobile device or vehicle.

19 Claims, 9 Drawing Sheets

Related U.S. Application Data filed on May 16, 2012, provisional application No. 61/534,753, filed on Sep. 14, 2011, provisional application No. 61/534,761, filed on Sep. 14, 2011, provisional application No. 61/534,772, filed on Sep. 14, 2011, provisional application No. 61/511,887, filed on Jul. 26, 2011, provisional application No. 61/647,941, filed on May 16, 2012, provisional application No. 61/511,880, filed on Jul. 26, 2011, provisional application No. 61/557,170, filed on Nov. 8, 2011, provisional application No. 61/581,566, filed on Dec. 29, 2011, provisional application No. 61/601,404, filed on Feb. 21, 2012, provisional application No. 61/601,949, filed on Feb. 22, 2012, provisional application No. 61/601,953, filed on Feb. 22, 2012.

(56) References Cited

U.S. PATENT DOCUMENTS

| | | | |
|---|---|---|---|
| 4,216,839 | A | 8/1980 | Gould et al. |
| 5,187,423 | A | 2/1993 | Marton |
| 5,339,250 | A | 8/1994 | Durbin |
| 5,349,535 | A | 9/1994 | Gupta |
| 5,544,784 | A | 8/1996 | Malaspina |
| 5,596,261 | A | 1/1997 | Suyama |
| 5,627,752 | A | 5/1997 | Buck et al. |
| 5,631,536 | A | 5/1997 | Tseng |
| 5,642,270 | A * | 6/1997 | Green et al. .............. 363/17 |
| 5,815,824 | A | 9/1998 | Saga et al. |
| 5,898,282 | A | 4/1999 | Drozdz et al. |
| 5,998,963 | A | 12/1999 | Aarseth |
| 6,016,882 | A | 1/2000 | Ishikawa |
| 6,177,867 | B1 | 1/2001 | Simon et al. |
| 6,177,879 | B1 | 1/2001 | Kokubu et al. |
| 6,403,251 | B1 | 6/2002 | Baggaley et al. |
| 6,498,457 | B1 | 12/2002 | Tsuboi |
| 6,515,580 | B1 | 2/2003 | Isoda et al. |
| 6,822,560 | B2 | 11/2004 | Geber et al. |
| 6,899,268 | B2 | 5/2005 | Hara |
| 6,952,795 | B2 | 10/2005 | O'Gorman et al. |
| 7,010,682 | B2 | 3/2006 | Reinold et al. |
| 7,131,005 | B2 | 10/2006 | Levenson et al. |
| 7,392,068 | B2 | 6/2008 | Dayan et al. |
| 7,415,332 | B2 | 8/2008 | Ito et al. |
| 7,495,543 | B2 | 2/2009 | Denison et al. |
| 7,567,166 | B2 | 7/2009 | Bourgine De Meder |
| 7,617,893 | B2 | 11/2009 | Syed et al. |
| 7,761,307 | B2 | 7/2010 | Ochi et al. |
| 7,778,746 | B2 | 8/2010 | McLeod et al. |
| 7,868,591 | B2 | 1/2011 | Phillips et al. |
| 7,908,020 | B2 | 3/2011 | Pieronek |
| 7,948,207 | B2 | 5/2011 | Scheucher |
| 7,979,147 | B1 | 7/2011 | Dunn |
| 7,993,155 | B2 | 8/2011 | Heichal et al. |
| 8,006,793 | B2 | 8/2011 | Heichal et al. |
| 8,006,973 | B2 | 8/2011 | Toba et al. |
| 8,013,571 | B2 | 9/2011 | Agassi et al. |
| 8,035,341 | B2 | 10/2011 | Genzel et al. |
| 8,063,762 | B2 | 11/2011 | Sid |
| 8,068,952 | B2 | 11/2011 | Valentine et al. |
| 8,106,631 | B2 | 1/2012 | Abe |
| 8,118,132 | B2 | 2/2012 | Gray, Jr. |
| 8,164,300 | B2 | 4/2012 | Agassi et al. |
| 8,229,625 | B2 | 7/2012 | Lal et al. |
| 8,265,816 | B1 | 9/2012 | LaFrance |
| 8,301,365 | B2 | 10/2012 | Niwa et al. |
| 8,326,259 | B2 | 12/2012 | Gautama et al. |
| 8,412,401 | B2 | 4/2013 | Bertosa et al. |
| 8,437,908 | B2 | 5/2013 | Goff et al. |
| 2002/0070851 | A1 | 6/2002 | Raichle et al. |
| 2003/0141840 | A1 | 7/2003 | Sanders |
| 2003/0163434 | A1 | 8/2003 | Barends |
| 2003/0209375 | A1 | 11/2003 | Suzuki et al. |
| 2004/0236615 | A1 * | 11/2004 | Msndy ............... 705/5 |
| 2004/0246119 | A1 | 12/2004 | Martin et al. |
| 2006/0047380 | A1 | 3/2006 | Welch |
| 2006/0208850 | A1 | 9/2006 | Ikeuchi et al. |
| 2007/0035397 | A1 | 2/2007 | Patenaude et al. |
| 2007/0090921 | A1 | 4/2007 | Fisher |
| 2007/0159297 | A1 | 7/2007 | Paulk et al. |
| 2009/0024872 | A1 | 1/2009 | Beverly |
| 2009/0033456 | A1 | 2/2009 | Castillo et al. |
| 2009/0082957 | A1 | 3/2009 | Agassi et al. |
| 2009/0112394 | A1 | 4/2009 | Lepejian et al. |
| 2009/0240575 | A1 | 9/2009 | Bettez et al. |
| 2010/0052588 | A1 | 3/2010 | Okamura et al. |
| 2010/0089547 | A1 | 4/2010 | King et al. |
| 2010/0094496 | A1 * | 4/2010 | Hershkovitz et al. ........ 701/22 |
| 2010/0114798 | A1 | 5/2010 | Sirton |
| 2010/0161481 | A1 | 6/2010 | Littrell |
| 2010/0201482 | A1 | 8/2010 | Robertson et al. |
| 2010/0308989 | A1 | 12/2010 | Gasper |
| 2011/0025267 | A1 * | 2/2011 | Kamen et al. ............. 320/109 |
| 2011/0029157 | A1 | 2/2011 | Muzaffer |
| 2011/0031929 | A1 | 2/2011 | Asada et al. |
| 2011/0032110 | A1 | 2/2011 | Taguchi |
| 2011/0071932 | A1 | 3/2011 | Agassi et al. |
| 2011/0106329 | A1 | 5/2011 | Donnelly et al. |
| 2011/0112710 | A1 | 5/2011 | Meyer-Ebeling et al. |
| 2011/0114798 | A1 | 5/2011 | Gemmati |
| 2011/0148346 | A1 | 6/2011 | Gagosz et al. |
| 2011/0160992 | A1 | 6/2011 | Crombez |
| 2011/0169447 | A1 | 7/2011 | Brown et al. |
| 2011/0200193 | A1 | 8/2011 | Blitz et al. |
| 2011/0202476 | A1 * | 8/2011 | Nagy et al. .............. 705/412 |
| 2011/0224900 | A1 | 9/2011 | Hiruta et al. |
| 2011/0270046 | A1 | 11/2011 | Ishibashi et al. |
| 2011/0279257 | A1 | 11/2011 | Au et al. |
| 2011/0303509 | A1 | 12/2011 | Agassi et al. |
| 2012/0019196 | A1 | 1/2012 | Fung |
| 2012/0038473 | A1 | 2/2012 | Fecher |
| 2012/0062361 | A1 | 3/2012 | Kosugi |
| 2012/0068817 | A1 | 3/2012 | Fisher |
| 2012/0078413 | A1 | 3/2012 | Baker, Jr. |
| 2012/0109519 | A1 | 5/2012 | Uyeki |
| 2012/0158229 | A1 | 6/2012 | Schaefer |
| 2012/0194346 | A1 | 8/2012 | Tsai et al. |
| 2012/0248868 | A1 | 10/2012 | Mobin et al. |
| 2012/0256588 | A1 | 10/2012 | Hayashi et al. |
| 2012/0259665 | A1 * | 10/2012 | Pandhi et al. ............... 705/4 |
| 2012/0316671 | A1 | 12/2012 | Hammerslag et al. |
| 2013/0024306 | A1 | 1/2013 | Shah et al. |
| 2013/0026972 | A1 | 1/2013 | Luke et al. |
| 2013/0027183 | A1 | 1/2013 | Wu et al. |
| 2013/0030581 | A1 | 1/2013 | Luke et al. |
| 2013/0030630 | A1 | 1/2013 | Luke et al. |
| 2013/0033203 | A1 | 2/2013 | Luke et al. |
| 2013/0046457 | A1 * | 2/2013 | Pettersson .............. 701/117 |
| 2013/0074411 | A1 | 3/2013 | Ferguson et al. |
| 2013/0090795 | A1 | 4/2013 | Luke et al. |
| 2013/0093271 | A1 | 4/2013 | Luke et al. |
| 2013/0093368 | A1 | 4/2013 | Luke et al. |
| 2013/0093384 | A1 | 4/2013 | Nyu et al. |
| 2013/0116892 | A1 | 5/2013 | Wu et al. |
| 2013/0119898 | A1 | 5/2013 | Ohkura |
| 2013/0127416 | A1 * | 5/2013 | Karner et al. ............ 320/109 |
| 2013/0132307 | A1 | 5/2013 | Phelps et al. |
| 2013/0181582 | A1 | 7/2013 | Luke et al. |
| 2013/0254097 | A1 | 9/2013 | Marathe et al. |
| 2013/0282254 | A1 | 10/2013 | Dwan et al. |
| 2014/0028089 | A1 | 1/2014 | Luke et al. |

FOREIGN PATENT DOCUMENTS

| | | |
|---|---|---|
| EP | 2 230 146 A2 | 9/2010 |
| EP | 2 428 939 A1 | 3/2012 |
| JP | 07-031008 A | 1/1995 |
| JP | 7-36504 U | 7/1995 |
| JP | 9-119839 A | 5/1997 |
| JP | 10170293 A * | 6/1998 |
| JP | 10-307952 A | 11/1998 |
| JP | 11-049079 | 2/1999 |

(56) References Cited

FOREIGN PATENT DOCUMENTS

| JP | 11-51681 | A | 2/1999 |
|---|---|---|---|
| JP | 11-176487 | A | 7/1999 |
| JP | 11-205914 | A | 7/1999 |
| JP | 2000-102102 | A | 4/2000 |
| JP | 2000-102103 | A | 4/2000 |
| JP | 2000-341868 | A | 12/2000 |
| JP | 2001-128301 | | 5/2001 |
| JP | 2003-118397 | | 4/2003 |
| JP | 2003-262525 | A | 9/2003 |
| JP | 2005-67453 | A | 3/2005 |
| JP | 2009-171646 | A | 7/2009 |
| JP | 2009-171647 | A | 7/2009 |
| JP | 4319289 | B2 | 8/2009 |
| JP | 2010-191636 | A | 9/2010 |
| JP | 2010-200405 | A | 9/2010 |
| JP | 2010-269686 | A | 12/2010 |
| JP | 2011-126452 | | 6/2011 |
| JP | 2011-131631 | A | 7/2011 |
| JP | 2011-142704 | A | 7/2011 |
| KR | 1998-045020 | U | 9/1998 |
| KR | 2004-0005146 | A | 1/2004 |
| KR | 20100012401 | A | 2/2010 |
| KR | 10-0971278 | B1 | 7/2010 |
| KR | 20110004292 | A | 1/2011 |
| KR | 20110041783 | A | 4/2011 |
| TW | 200836452 | A | 9/2008 |
| TW | I315116 | B | 9/2009 |
| TW | M371880 | U1 | 1/2010 |
| TW | M379269 | U1 | 4/2010 |
| TW | M379789 | U1 | 5/2010 |
| TW | M385047 | U1 | 7/2010 |
| TW | 201043986 | A1 | 12/2010 |
| TW | 201044266 | A1 | 12/2010 |
| WO | 98/21132 | A1 | 5/1998 |
| WO | 2009/039454 | A1 | 3/2009 |
| WO | 2010/033517 | A2 | 3/2010 |
| WO | 2010/143483 | A1 | 12/2010 |
| WO | 2011/138205 | A1 | 11/2011 |
| WO | 2012/160407 | A1 | 11/2012 |
| WO | 2012/160557 | A2 | 11/2012 |
| WO | 2013/024483 | A2 | 2/2013 |
| WO | 2013/024484 | A1 | 2/2013 |
| WO | 2013/074819 | A1 | 5/2013 |
| WO | 2013/080211 | A1 | 6/2013 |
| WO | 2013/102894 | A1 | 7/2013 |
| WO | 2013/108246 | A2 | 7/2013 |
| WO | 2013/118113 | A2 | 8/2013 |
| WO | 2013/142154 | A1 | 9/2013 |
| WO | 2013/144951 | A1 | 10/2013 |

OTHER PUBLICATIONS

Chen et al., "Apparatus, System, and Method for Authentication of Vehicular Components ," U.S. Appl. No. 61/783,041, filed Mar. 14, 2013, 84 pages.
Chen et al., "Apparatus, System, and Method for Authentication of Vehicular Components," Office Action mailed Nov. 22, 2013, for U.S. Appl. No. 13/918,703, 35 pages.
Chen et al., "Apparatus, System, and Method for Authentication of Vehicular Components," Notice of Allowance mailed Mar. 25, 2014, for U.S. Appl. No. 13/918,703, 7 pages.
Chen et al., "Apparatus, Method and Article for Providing Vehicle Diagnostic Data," Office Action mailed Dec. 30, 2013, for U.S. Appl. No. 14/022,134, 20 pages.
Chen et al., "Apparatus, Method and Article for Providing Vehicle Diagnostic Data," U.S. Appl. No. 14/022,134, filed Sep. 9, 2013, 61 pages.
Communication pursuant to Rules 161(2) and 162 EPC, for corresponding European Patent Application No. 12817273.1, dated Mar. 25, 2014, 3 pages.
Communication pursuant to Rules 161(2) and 162 EPC, for corresponding European Patent Application No. 12817141.0, dated Mar. 26, 2014, 3 pages.
Communication pursuant to Rules 161(2) and 162 EPC, for corresponding European Patent Application No. 12818308.4, dated Mar. 26, 2014, 3 pages.
Communication pursuant to Rules 161(2) and 162 EPC, for corresponding European Patent Application No. 12817696.3, dated Mar. 27, 2014, 3 pages.
Communication pursuant to Rules 161(2) and 162 EPC, for corresponding European Patent Application No. 12817883.7, dated Mar. 27, 2014, 3 pages.
Communication pursuant to Rules 161(2) and 162 EPC, for corresponding European Patent Application No. 12818447.0, dated Mar. 27, 2014, 3 pages.
Huang et al., "Apparatus, Method and Article for Vehicle Turn Signals," U.S. Appl. No. 61/727,403, filed Nov. 16, 2012, 41 pages.
Huang et al., "Apparatus, Method and Article for Vehicle Turn Signals," U.S. Appl. No. 14/079,894, filed Nov. 14, 2013, 41 pages.
International Preliminary Report on Patentability and Written Opinion for corresponding International Patent Application No. PCT/US2012/048349, issued on Jan. 28, 2014, 5 pages.
International Preliminary Report on Patentability and Written Opinion for corresponding International Patent Application No. PCT/US2012/048354, issued on Jan. 28, 2014, 7 pages.
International Preliminary Report on Patentability and Written Opinion for corresponding International Patent Application No. PCT/US2012/048358, issued on Jan. 28, 2014, 5 pages.
International Preliminary Report on Patentability and Written Opinion for corresponding International Patent Application No. PCT/US2012/048366, issued on Jan. 28, 2014, 5 pages.
International Preliminary Report on Patentability and Written Opinion for corresponding International Patent Application No. PCT/US2012/048367, issued on Jan. 28, 2014, 4 pages.
International Preliminary Report on Patentability and Written Opinion for corresponding International Patent Application No. PCT/US2012/048375, issued on Jan. 28, 2014, 5 pages.
International Preliminary Report on Patentability and Written Opinion for corresponding International Patent Application No. PCT/US2012/048379, issued on Jan. 28, 2014, 5 pages.
International Preliminary Report on Patentability and Written Opinion for corresponding International Patent Application No. PCT/US2012/048380, issued on Jan. 28, 2014, 5 pages.
International Preliminary Report on Patentability and Written Opinion for corresponding International Patent Application No. PCT/US2012/048382, issued on Jan. 28, 2014, 5 pages.
International Preliminary Report on Patentability and Written Opinion for corresponding International Patent Application No. PCT/US2012/048391, issued on Jan. 28, 2014, 6 pages.
International Search Report and Written Opinion for corresponding International Patent Application No. PCT/US2012/048347, mailed Dec. 18, 2012, 8 pages.
International Search Report and Written Opinion for corresponding International Application No. PCT/US2013/070131, mailed Feb. 19, 2014, 17 pages.
Luke et al., "Apparatus, Method and Article for Authentication, Security and Control of Portable Charging Devices and Power Storage Devices, Such as Batteries," Office Action mailed Jan. 6, 2014, for U.S. Appl. No. 14/017,090, 19 pages.
Luke et al., "Detectible Indication of an Electric Motor Vehicle Standby Mode," Office Action for U.S. Appl. No. 13/646,320, mailed May 30, 2013, 13 pages.
Luke et al., "Drive Assembly for Electric Powered Device," U.S. Appl. No. 61/546,411, filed Oct. 12, 2011, 18 pages.
Luke et al., "Modular System for Collection and Distribution of Electric Storage Devices," U.S. Appl. No. 14/202,589, filed Mar. 10, 2014, 76 pages.
Luke et al., "Apparatus, Method and Article for Authentication, Security and Control of Power Storage Devices, Such as Batteries," Office Action mailed Feb. 26, 2014, for U.S. Appl. No. 13/559,038, 13 pages.
Luke et al., "Apparatus, Method and Article for Authentication, Security and Control of Power Storage Devices, Such as Batteries," Office Action mailed Feb. 25, 2014, for U.S. Appl. No. 14/023,344, 12 pages.

(56) References Cited

OTHER PUBLICATIONS

Luke et al., "Dynamically Limiting Vehicle Operation for Best Effort Economy," Office Action for U.S. Appl. No. 13/559,264, mailed Feb. 12, 2014, 24 pages.
Luke, "Apparatus, Method and Article for Changing Portable Electrical Power Storage Device Exchange Plans," U.S. Appl. No. 14/204,587, filed Mar. 11, 2014, 56 pages.
Luke, "Apparatus, Method and Article for Providing Information Regarding a Vehicle via a Mobile Device," Office Action for U.S. Appl. No. 14/017,081, mailed Jan. 30, 2014, 36 pages.
Taylor et al., "Apparatus, Method and Article for Physical Security of Power Storage Devices in Vehicles," U.S. Appl. No. 14/012,845, filed Aug. 28, 2013, 64 pages.
Wu et al., "Battery Configuration for an Electric Vehicle," U.S. Appl. No. 61/716,388, filed Oct. 19, 2012, 37 pages.
Wu et al., "Apparatus, Method and Article for a Power Storage Device Compartment," Office Action for U.S. Appl. No. 13/559,125, mailed Feb. 24, 2014, 28 pages.
Wu et al., "Apparatus, Method and Article for Providing Information Regarding Availability of Power Storage Devices at a Power Storage Device Collection, Charging and Distribution Machine," U.S. Appl. No. 14/022,140, filed Sep. 9, 2013, 56 pages.
Wu et al., "Apparatus, Method and Article for Providing Information Regarding Availability of Power Storage Devices at a Power Storage Device Collection, Charging and Distribution Machine," Office Action mailed Mar. 5, 2014, for U.S. Appl. No. 14/022,140, 8 pages.
Wu et al., "Apparatus, Method and Article for Providing Locations of Power Storage Device Collection, Charging and Distribution Machines," Office Action mailed Nov. 19, 2013, for U.S. Appl. No. 14/022,147, 10 pages.
Wu et al., "Apparatus, Method and Article for Providing Locations of Power Storage Device Collection, Charging and Distribution Machines," U.S. Appl. No. 14/022,147, filed Sep. 9, 2013, 56 pages.
Wu et al., "Apparatus, Method and Article for Providing Locations of Power Storage Device Collection, Charging and Distribution Machines," Office Action mailed Mar. 5, 2014, for U.S. Appl. No. 14/022,147, 12 pages.
Wu, "Battery Configuration for an Electric Vehicle," U.S. Appl. No. 14/057,405, filed Oct. 18, 2013, 38 pages.
Chen et al., "Apparatus, System, and Method for Authentication of Vehicular Components," U.S. Appl. No. 13/918,703, filed Jun. 14, 2013, 84 pages.
Chen et al., "Apparatus, Method and Article for Providing Vehicle Diagnostic Data," U.S. Appl. No. 13/559,390, filed Jul. 26, 2012, 61 pages.
International Search Report and Written Opinion for corresponding European Patent Application No. PCT/US2012/048349, mailed Feb. 18, 2013, 9 pages.
International Search Report and Written Opinion for corresponding European Patent Application No. PCT/US2012/048354, mailed Feb. 18, 2013, 11 pages.
International Search Report and Written Opinion for corresponding European Patent Application No. PCT/US2012/048358, mailed Feb. 25, 2013, 9 pages.
International Search Report and Written Opinion for corresponding European Patent Application No. PCT/US2012/048366, mailed Jan. 21, 2013, 10 pages.
International Search Report and Written Opinion for corresponding European Patent Application No. PCT/US2012/048367, mailed Jan. 17, 2013, 8 pages.
International Search Report and Written Opinion for corresponding European Patent Application No. PCT/US2012/048375, mailed Jan. 23, 2013, 9 pages.
International Search Report and Written Opinion for corresponding International Application No. PCT/US2012/048391, mailed Dec. 21, 2012, 9 pages.
International Search Report and Written Opinion for corresponding International Patent Application No. PCT/US2012/048380, mailed Feb. 27, 2013, 9 pages.
International Search Report and Written Opinion for corresponding International Patent Application No. PCT/US2012/048382, mailed Feb. 27, 2013, 9 pages.
International Search Report and Written Opinion for corresponding European Patent Application No. PCT/US2012/063979, mailed Mar. 4, 2013, 10 pages.
Luke et al., "Apparatus, Method and Article for Authentication, Security and Control of Portable Charging Devices and Power Storage Devices, Such as Batteries," U.S. Appl. No. 14/017,090, filed Sep. 3, 2013, 69 pages.
Luke et al., "Apparatus, Method and Article for Authentication, Security and Control of Portable Charging Devices and Power Storage Devices, Such as Batteries," U.S. Appl. No. 61/773,621, filed Mar. 6, 2013, 69 pages.
Luke et al., "Apparatus, Method and Article for Providing Targeted Advertising in a Rechargeable Electrical Power Storage Device Distribution Environment," U.S. Appl. No. 61/773,614, filed Mar. 6, 2013, 77 pages.
Luke et al., "Detectible Indication of an Electric Motor Vehicle Standby Mode," U.S. Appl. No. 61/543,720, filed Oct. 5, 2011, 35 pages.
Luke et al., "Detectible Indication of an Electric Motor Vehicle Standby Mode," U.S. Appl. No. 61/684,432, filed Aug. 17, 2012, 41 pages.
Luke et al., "Modular System for Collection and Distribution of Electric Storage Devices," U.S. Appl. No. 61/789,065, filed Mar. 15, 2013, 76 pages.
Luke et al., "Apparatus, Method and Article for Authentication, Security and Control of Power Storage Devices, Such as Batteries," U.S. Appl. No. 13/559,038, filed Jul. 26, 2012, 59 pages.
Luke et al., "Apparatus, Method and Article for Authentication, Security and Control of Power Storage Devices, Such as Batteries, Based on User Profiles," U.S. Appl. No. 13/559,010, filed Jul. 26, 2012, 58 pages.
Luke et al., "Apparatus, Method and Article for Collection, Charging and Distributing Power Storage Devices, Such as Batteries," U.S. Appl. No. 13/559,314, filed Jul. 26, 2012, 81 pages.
Luke et al., "Apparatus, Method and Article for Redistributing Power Storage Devices, Such as Batteries, Between Collection Charging and Distribution Machines," U.S. Appl. No. 13/559,091, filed Jul. 26, 2012, 69 pages.
Luke et al., "Apparatus, Method and Article for Reserving Power Storage Devices at Reserving Power Storage Device Collection, Charging and Distribution Machines," U.S. Appl. No. 13/559,064, filed Jul. 26, 2012, 72 pages.
Luke et al., "Detectible Indication of an Electric Motor Vehicle Standby Mode," U.S. Appl. No. 13/646,320, filed Oct. 5, 2012, 41 pages.
Luke et al., "Dynamically Limiting Vehicle Operation for Best Effort Economy," U.S. Appl. No. 13/559,264, filed Jul. 26, 2012, 56 pages.
Luke et al., "Dynamically Limiting Vehicle Operation for Best Effort Economy," Office Action for U.S. Appl. No. 13/559,264, mailed Aug. 14, 2013, 21 pages.
Luke et al., "Electric Device Drive Assembly and Cooling System for Electric Device Drive," U.S. Appl. No. 13/650,395, filed Oct. 12, 2012, 62 pages.
Luke et al., "Electric Devices," U.S. Appl. No. 13/650,498, filed Oct. 12, 2012, 26 pages.
Luke et al., "Improved Drive Assembly for Electric Device," U.S. Appl. No. 13/650,392, filed Oct. 12, 2012, 43 pages.
Luke et al., "Thermal Management of Components in Electric Motor Drive Vehicles," U.S. Appl. No. 13/559,259, filed Jul. 26, 2012, 51 pages.
Luke, "Apparatus, Method and Article for Changing Portable Electrical Power Storage Device Exchange Plans," U.S. Appl. No. 61/778,038, filed Mar. 12, 2013, 56 pages.
Luke, "Apparatus, Method and Article for Providing Information Regarding a Vehicle Via a Mobile Device," U.S. Appl. No. 14/017,081, filed Sep. 3, 2013, 81 pages.
Luke, "Apparatus, Method and Article for Providing Information Regarding a Vehicle via a Mobile Device," U.S. Appl. No. 61/780,781, filed Mar. 13, 2013, 80 pages.

(56) References Cited

OTHER PUBLICATIONS

Taylor et al., "Apparatus, Method and Article for Physical Security of Power Storage Devices in Vehicles," U.S. Appl. No. 13/559,054, filed Jul. 26, 2012, 64 pages.
Taylor et al., "Apparatus, Method and Article for Physical Security of Power Storage Devices in Vehicles," Notice of Allowance for U.S. Appl. No. 13/559,054, mailed May 30, 2013, 32 pages.
Taylor et al., "Apparatus, Method and Article for Physical Security of Power Storage Devices in Vehicles," Office Action for U.S. Appl. No. 13/559,054, mailed Dec. 3, 2012, 11 pages.
Wu et al., "Apparatus, Method and Article for a Power Storage Device Compartment," U.S. Appl. No. 13/559,125, filed Jul. 26, 2012, 65 pages.
Wu et al., "Apparatus, Method and Article for Providing Information Regarding Availability of Power Storage Devices at a Power Storage Device Collection, Charging and Distribution Machine," U.S. Appl. No. 13/559,343, filed Jul. 26, 2012, 56 pages.
Wu et al., "Apparatus, Method and Article for Security of Vehicles," U.S. Appl. No. 61/557,176, filed Nov. 8, 2011, 37 pages.
Chen et al., "Apparatus, Method and Article for Providing Vehicle Diagnostic Data," U.S. Appl. No. 61/601,404, filed Feb. 21, 2012, 56 pages.
Luke et al., "Apparatus, Method and Article for Authentication, Security and Control of Power Storage Devices, Such as Batteries," U.S. Appl. No. 61/534,761, filed Sep. 14, 2011, 55 pages.
Luke et al., "Apparatus, Method and Article for Authentication, Security and Control of Power Storage Devices, Such as Batteries," U.S. Appl. No. 13/559,038, 59 pages, filed Jul. 26, 2012.
Luke et al., "Apparatus, Method and Article for Authentication, Security and Control of Power Storage Devices, Such as Batteries, Based on User Profiles," U.S. Appl. No. 61/534,772, filed Sep. 14, 2011, 55 pages.
Luke et al., "Apparatus, Method and Article for Collection, Charging and Distribution Power Storage Devices, Such as Batteries," U.S. Appl. No. 61/511,900, filed Jul. 26, 2011, 73 pages.
Luke et al., "Apparatus, Method and Article for Collection, Charging and Distributing Power Storage Devices, Such as Batteries," U.S. Appl. No. 61/647,936, filed May 16, 2012, 76 pages.
Luke et al., "Apparatus, Method and Article for Distributing Power Storage Devices, Such as Batteries, Between Collection, Charging and Distribution Machines," U.S. Appl. No. 61/534,753, filed Sep. 14, 2011, 65 pages.
Luke et al., "Dynamically Limiting Vehicle Operation for Best Effort Economy," U.S. Appl. No. 61/511,880, filed Jul. 26, 2011, 52 pages.
Luke et al., "Thermal Management of Components in Electric Motor Drive Vehicles," U.S. Appl. No. 61/647,941, filed May 16, 2012, 47 pages.
Luke et al., "Thermal Management of Components in Electric Motor Drive Vehicles," U.S. Appl. No. 61/511,887, filed Jul. 26, 2011, 44 pages.
Taylor et al., "Apparatus, Method and Articles for Physical Security of Power Storage Devices in Vehicles," U.S. Appl. No. 61/557,170, filed Nov. 8, 2011, 60 pages.
Wu et al., "Apparatus, Method and Article for a Power Storage Device Compartment," U.S. Appl. No. 61/581,566, filed Dec. 29, 2011, 61 pages.
Wu et al., "Apparatus, Method and Article for Providing Information Regarding Availability of Power Storage Devices at a Power Storage Device Collection, Charging and Distribution Machine," U.S. Appl. No. 61/601,953, filed Feb. 22, 2012, 53 pages.
Wu et al., "Apparatus, Method and Article for Providing Locations of Power Storage Device Collection, Charging and Distribution Machines," U.S. Appl. No. 61/601,949, filed Feb. 22, 2012, 56 pages.

\* cited by examiner

APPARATUS, METHOD AND ARTICLE FOR PROVIDING LOCATIONS OF POWER STORAGE DEVICE COLLECTION, CHARGING AND DISTRIBUTION MACHINES

CROSS REFERENCE TO RELATED APPLICATIONS

This application claims the benefit under 35 U.S.C. 119(e) of the filing date of U.S. provisional patent application Ser. No. 61/511,900 entitled "APPARATUS, METHOD AND ARTICLE FOR COLLECTION, CHARGING AND DISTRIBUTING POWER STORAGE DEVICES, SUCH AS BATTERIES" and filed Jul. 26, 2011, U.S. provisional patent application Ser. No. 61/647,936 entitled "APPARATUS, METHOD AND ARTICLE FOR COLLECTION, CHARGING AND DISTRIBUTING POWER STORAGE DEVICES, SUCH AS BATTERIES" and filed May 16, 2012, U.S. provisional patent application Ser. No. 61/534,753 entitled "APPARATUS, METHOD AND ARTICLE FOR REDISTRIBUTING POWER STORAGE DEVICES, SUCH AS BATTERIES, BETWEEN COLLECTION, CHARGING AND DISTRIBUTION MACHINES" and filed Sep. 14, 2011, U.S. provisional patent application Ser. No. 61/534,761 entitled "APPARATUS, METHOD AND ARTICLE FOR AUTHENTICATION, SECURITY AND CONTROL OF POWER STORAGE DEVICES SUCH AS BATTERIES" and filed Sep. 14, 2011, U.S. provisional patent application Ser. No. 61/534,772 entitled "APPARATUS, METHOD AND ARTICLE FOR AUTHENTICATION, SECURITY AND CONTROL OF POWER STORAGE DEVICES, SUCH AS BATTERIES, BASED ON USER PROFILES" and filed Sep. 14, 2011, U.S. provisional patent application Ser. No. 61/511,887 entitled "THERMAL MANAGEMENT OF COMPONENTS IN ELECTRIC MOTOR DRIVE VEHICLES" and filed Jul. 26, 2011, U.S. provisional patent application Ser. No. 61/647,941 entitled "THERMAL MANAGEMENT OF COMPONENTS IN ELECTRIC MOTOR DRIVE VEHICLES" and filed May 16, 2012, U.S. provisional patent application Ser. No. 61/511,880 entitled "DYNAMICALLY LIMITING VEHICLE OPERATION FOR BEST EFFORT ECONOMY" and filed Jul. 26, 2011, U.S. provisional patent application Ser. No. 61/557,170 entitled "APPARATUS, METHOD, AND ARTICLE FOR PHYSICAL SECURITY OF POWER STORAGE DEVICES IN VEHICLES" and filed Nov. 8, 2011, U.S. provisional patent application Ser. No. 61/581,566 entitled "APPARATUS, METHOD AND ARTICLE FOR A POWER STORAGE DEVICE COMPARTMENT" and filed Dec. 29, 2011, U.S. provisional patent application Ser. No. 61/601,404 entitled "APPARATUS, METHOD AND ARTICLE FOR PROVIDING VEHICLE DIAGNOSTIC DATA" and filed Feb. 21, 2012, U.S. provisional patent application Ser. No. 61/601,949 entitled "APPARATUS, METHOD AND ARTICLE FOR PROVIDING LOCATIONS OF POWER STORAGE DEVICE COLLECTION, CHARGING AND DISTRIBUTION MACHINES" and filed Feb. 22, 2012, and U.S. provisional patent application Ser. No. 61/601,953 entitled "APPARATUS, METHOD AND ARTICLE FOR PROVIDING INFORMATION REGARDING AVAILABILITY OF POWER STORAGE DEVICES AT A POWER STORAGE DEVICE COLLECTION, CHARGING AND DISTRIBUTION MACHINE" and filed Feb. 22, 2012.

BACKGROUND

1. Technical Field

The present disclosure generally relates to the distribution of rechargeable electrical power storage devices (e.g., secondary batteries, supercapacitors or ultracapacitors), which may be suitable for use in a variety of fields or applications, for instance transportation and non-transportation uses.

2. Description of the Related Art

There are a wide variety of uses or applications for portable electrical power storage devices.

One such application is in the field of transportation. Hybrid and all electrical vehicles are becoming increasingly common. Such vehicles may achieve a number of advantages over traditional internal combustion engine vehicles. For example, hybrid or electrical vehicles may achieve higher fuel economy and may have little or even zero tail pipe pollution. In particular, all electric vehicles may not only have zero tail pipe pollution, but may be associated with lower overall pollution. For example, electrical power may be generated from renewable sources (e.g., solar, hydro). Also for example, electrical power may be generated at generation plants that produce no air pollution (e.g., nuclear plants). Also for example, electrical power may be generated at generation plants that burn relatively "clean burning" fuels (e.g., natural gas), which have higher efficiency than internal combustion engines, and/or which employ pollution control or removal systems (e.g., industrial air scrubbers) which are too large, costly or expensive for use with individual vehicles.

Personal transportation vehicles such as combustion engine powered scooters and/or motorbikes are ubiquitous in many places, for example in the many large cities of Asia. Such scooters and/or motorbikes tend to be relatively inexpensive, particularly as compared to automobiles, cars or trucks. Cities with high numbers of combustion engine scooters and/or motorbikes also tend to be very densely populated and suffer from high levels of air pollution. When new, many combustion engine scooters and/or motorbikes provide a relatively low polluting source of personal transportation. For instance, such scooters and/or motorbikes may have higher mileage ratings than larger vehicles. Some scooters and/or motorbikes may even be equipped with basic pollution control equipment (e.g., catalytic converter). Unfortunately, factory specified levels of emission are quickly exceeded as the scooters and/or motorbikes are used and either not maintained and/or as the scooters and/or motorbikes are modified, for example by intentional or unintentional removal of catalytic converters. Often owners or operators of scooters and/or motorbikes lack the financial resources or the motivation to maintain their vehicles.

It is known that air pollution has a negative effect on human health, being associated with causing or exacerbating various diseases (e.g., various reports tie air pollution to emphysema, asthma, pneumonia, cystic fibrosis as well as various cardiovascular diseases). Such diseases take large numbers of lives and severely reduce the quality of life of countless others.

BRIEF SUMMARY

Zero tail pipe pollution alternatives to combustion engines would greatly benefit air quality, and hence the health of large populations.

While the zero tail pipe emissions benefit of all-electric vehicles are appreciated, adoption of all-electric vehicles by large populations has been slow. One of the reasons appears to be the cost, particularly the cost of secondary batteries. Another one of the reasons appears to be the limited driving range available on a single charge of a battery, and the relatively long time (e.g., multiple hours) necessary to recharge a secondary battery when depleted.

The approaches described herein may address some of the issues which have limited adoption of zero tail pipe emission technology, particularly in densely crowded cities, and in populations with limited financial resources.

For example, some of the approaches described herein employ collection, charging and distribution machines, which may be otherwise be termed as kiosks or vending machines, to collect, charge and distribute electrical power storage devices (e.g., batteries, supercapacitors or ultracapacitors). Such machines may be distributed about a city or other region at a variety of locations, such as convenience stores or existing gas or petrol filling stations.

The collection, charging and distribution machines may maintain a stock of fully charged or almost fully charged electrical storage devices for use by end users. The collection, charging and distribution machines may collect, receive or otherwise accept depleted electrical storage devices, for example as returned by end users, recharging such for reuse by subsequent end users.

Thus, as a battery or other electrical power storage device reaches or approaches the end of its stored charge, an end user may simply replace, exchange or otherwise swap batteries or other electrical power storage devices. This may address issues related to cost, as well as limited range and relatively long recharging times.

As previously noted, secondary batteries and other electrical power storage devices are relatively expensive. Thus, it is beneficial to stock the least number of electrical power storage devices possible, while still ensuring that demand for such is satisfied.

For these reasons, the ability to have electrical power storage devices available is important to commercial success of any such endeavor. A number of approaches are described herein to provide availability of charged electrical power storage devices to meet current demand A method of operating a system for providing locations of collection, charging and distribution machines for collection, charging and distribution of portable electrical energy storage devices may be summarized as including: receiving, by the system for providing locations of collection, charging and distribution machines, information regarding locations of a plurality of collection, charging and distribution machines for collection, charging and distribution of portable electrical energy storage devices; receiving, by the system for providing locations of collection, charging and distribution machines, information regarding a location of a user; and communicating to the user locations of one or more of the plurality of collection, charging and distribution machines that are one or more of: within a particular distance from the location of the user and within a particular driving time from the location of the user.

The particular distance may be within approximately a ten kilometer radius from the location of the user. The driving time may be approximately fifteen minutes. The communicating to the user the locations of one or more of the plurality of collection, charging and distribution machines may include communicating to a mobile device of the user the user locations of one or more of the plurality of collection, charging and distribution machines that are both within the particular distance from the location of the user and within the particular driving time from the location of the user. The method may further include communicating to a mobile device of the user how many portable electrical energy storage devices are available at each of the one or more of the plurality of collection, charging and distribution machines. The method may further include receiving a request originating from the user to reserve a portable electrical energy storage device available at one of the one or more of the plurality of collection, charging and distribution machines; and in response to the request, reserving for the user an available portable electrical energy storage device at the one of the one or more of the plurality of collection, charging and distribution machines. The available portable electrical energy storage device may be reserved for a limited amount of time for the user. The limited amount of time may be based on one or more of: a distance of the one of the one or more of the plurality of collection, charging and distribution machines at which the available portable electrical energy storage device is reserved from the location of the user and a driving time from the location of the user to the one of the one or more of the plurality of collection, charging and distribution machines at which the available portable electrical energy storage device is reserved. The limited amount of time may be approximately fifteen minutes. The reserving for the user an available portable electrical energy storage device may include decreasing a stored value indicative of how many portable electrical energy storage devices are available at the one of the one or more of the plurality of collection, charging and distribution machines. The method may further include communicating to the user how many portable electrical energy storage devices are available at each of the one or more of the plurality of collection, charging and distribution machines; and communicating to the user types of portable electrical energy storage devices that are available at each of the one or more of the plurality of collection, charging and distribution machines. The method may further include receiving a request originating from the user to reserve a portable electrical energy storage device of a particular type of the types of portable electrical energy storage devices that are available at the one or more of the plurality of collection, charging and distribution machines; and in response to the request, reserving for the user an available portable electrical energy storage device of the particular type at the one of the one or more of the plurality of collection, charging and distribution machines.

A system for providing locations of collection, charging and distribution machines for collection, charging and distribution of portable electrical energy storage devices may be summarized as including at least one processor of the system for providing locations of collection, charging and distribution machines; and at least one processor-readable memory of the system for providing locations of collection, charging and distribution machines that stores instructions executable by the at least one processor to cause the at least one processor to: receive information regarding locations of one or more of a plurality of collection, charging and distribution machines that are one or more of: within a particular distance from a location of a user and within a particular driving time from the location of the user; and display a map on which the location of the user is indicated and on which one or more of the locations of the one or more of the plurality of collection, charging and distribution machines are indicated.

The instructions may be executable by the at least one processor to further cause the at least one processor to: receive information regarding the current location of the user; and compare the current location of the user with the locations of the one or more of a plurality of collection, charging and distribution machines. The instructions may be executable by the at least one processor to further cause the at least one processor to: indicate on the displayed map the location of the user and the locations of the one or more of the plurality of collection, charging and distribution machines based on the comparison of the current location of the user with the locations of the one or more of a plurality of collection, charging and distribution machines. The instructions may be executable by the at least one processor to further cause the at least one processor to: indicate on the displayed map whether a portable electrical energy storage device is available at each of the one or more of the plurality of collection, charging and distribution machines for which a location is indicated on the displayed map. The instructions may be executable by the at least one processor to further cause the at least one processor to: receive information regarding availability of portable electrical energy storage devices at each of the one or more of the plurality of collection, charging and distribution machines; and indicate on the displayed map locations only of the one or more of the plurality of collection, charging and distribution machines at which at least one portable electrical energy storage device is available based on the received information regarding availability of portable electrical energy storage devices. The instructions may be executable by the at least one processor to further cause the at least one processor to: receive from the user a selection of one of the collection, charging and distribution machine locations indicated on the displayed map; communicating the selection to reserve an available portable electrical energy storage device at a collection, charging and distribution machine at the selected location. The instructions may be executable by the at least one processor to further cause the at least one processor to: display an indication on a device of the user that the available portable electrical energy storage device at the collection, charging and distribution machine at the selected location has been reserved for the user. The instructions may be executable by the at least one processor to further cause the at least one processor to: display an indication on a device of the user of how much time is remaining until a reservation of the portable electrical energy storage device at the collection, charging and distribution machine at the selected location expires.

A non-transitory computer-readable medium that stores instructions that when executed by a system for providing locations of collection, charging and distribution machines for collection, charging and distribution of portable electrical energy storage devices, may cause the system for providing locations of collection, charging and distribution machines to perform: receiving from a user an indication of a selection of one of a plurality of collection, charging and distribution machine locations indicated on a map displayed on a device of the user; communicating the selection to reserve an available portable electrical energy storage device at a collection, charging and distribution machine at the selected location.

The instructions may further cause the system for providing locations of collection, charging and distribution machines to perform: indicating on the displayed map a location of a user; receiving from the user an indication of a selection of a distance; determining which collection, charging and distribution machines of a plurality of collection, charging and distribution machines have one or more portable electrical energy storage devices available and are within the selected distance from the user; and indicating on the displayed map selectable locations of the determined collection, charging and distribution machines. The instructions may further cause the system for providing locations of collection, charging and distribution machines to perform: indicating on the displayed map a location of a user; receiving from the user an indication of a selection of a driving time; determining which collection, charging and distribution machines of a plurality of collection, charging and distribution machines have one or more portable electrical energy storage devices available and are within the selected driving time; and indicating on the displayed map selectable locations of the determined collection, charging and distribution machines. The instructions may further cause the system for providing locations of collection, charging and distribution machines to perform: communicating driving directions on the displayed map to the collection, charging and distribution machine at the selected location.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with vending apparatus, batteries, supercapacitors or ultracapacitors, power converters including but not limited to transformers, rectifiers, DC/DC power converters, switch mode power converters, controllers, and communications systems and structures and networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

Reference to portable electrical power storage device means any device capable of storing electrical power and releasing stored electrical power including but not limited to batteries, supercapacitors or ultracapacitors. Reference to batteries means chemical storage cell or cells, for instance rechargeable or secondary battery cells including but not limited to nickel cadmium alloy or lithium ion battery cells.

The headings and Abstract of the Disclosure provided herein are for convenience only and do not interpret the scope or meaning of the embodiments.

Figure 1:
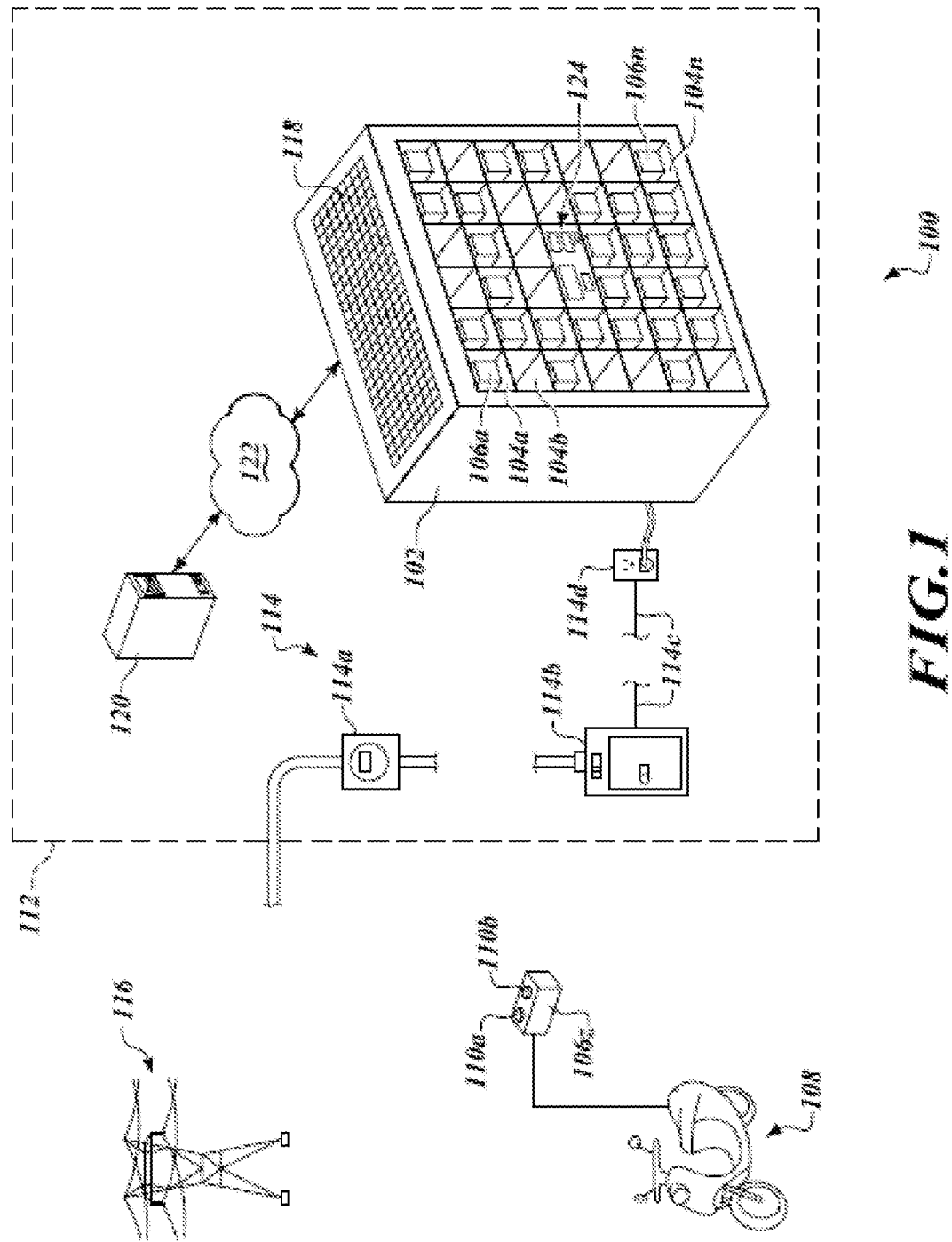
FIG. 1 is a schematic view of a collection, charging and distribution machine along with a number of electrical power storage devices according to one non-limiting illustrated embodiment, along with an electric scooter or motorbike, and an electrical service provided via an electrical grid.

FIG. 1 shows an environment 100 including a collection, charging and distribution machine 102, according to one illustrated embodiment.

The collection, charging and distribution machine 102 may take the form of a vending machine or kiosk. The collection, charging and distribution machine 102 has a plurality of receivers, compartments or receptacles 104a, 104b-104n (only three called out in FIG. 1, collectively 104) to removably receive portable electrical energy storage devices (e.g., batteries, supercapacitors or ultracapacitors) 106a-106n (collectively 106) for collection, charging and distribution. As illustrated in FIG. 1, some of the receivers 104 are empty, while other receivers 104 hold portable electrical energy storage devices 106. While FIG. 1 shows a single portable electrical energy storage device 106 per receiver 104, in some embodiments each receiver 104 may hold two or even more portable electrical energy storage devices 106. For example, each of the receivers 104 may be sufficiently deep to receive three portable electrical energy storage devices 106. Thus, for example, the collection, charging and distribution machine 102 illustrated in FIG. 1 may have a capacity capable of simultaneously holding 40, 80 or 120 portable electrical energy storage devices 106.

The portable electrical energy storage devices 106 may take a variety of forms, for example batteries (e.g., array of battery cells) or supercapacitors or ultracapacitors (e.g., array of ultracapacitor cells). For example, the portable electrical energy storage devices 106z may take the form of rechargeable batteries (i.e., secondary cells or batteries). The portable electrical energy storage devices 106z may, for instance, be sized to physically fit, and electrically power, personal transportation vehicles, such as all-electric scooters or motorbikes 108. As previously noted, combustion engine scooters and motorbikes are common in many large cities, for example in Asia, Europe and the Middle East. The ability to conveniently access charged batteries throughout a city or region may allow the use of all-electric scooters and motorbikes 108 in place of combustion engine scooters and motorbikes, thereby alleviating air pollution, as well as reducing noise.

The portable electrical energy storage devices 106 (only visible for portable electrical energy storage device 106z) may include a number of electrical terminals 110a, 110b (two illustrated, collectively 110), accessible from an exterior of the portable electrical energy storage device 106z. The electrical terminals 110 allow charge to be delivered from the portable electrical energy storage device 106z, as well as allow charge to be delivered to the portable electrical energy storage device 106z for charging or recharging the same. While illustrated in FIG. 1 as posts, the electrical terminals 110 may take any other form which is accessible from an exterior of the portable electrical energy storage device 106z, including electrical terminals positioned within slots in a battery housing.

The collection, charging and distribution machine 102 is positioned at some location 112 at which the collection, charging and distribution machine 102 is conveniently and easily accessible by various end users. The location may take any of a large variety of forms, for example, a retail environment such as a convenience store, supermarket, gas or petrol station, or service shop. Alternatively, the collection, charging and distribution machine 102 may stand alone at a location 112 not associated with an existing retail or other business, for example in public parks or other public places.

Thus, for example, collection, charging and distribution machines 102 may be located at each store of a chain of convenience stores throughout a city or region. Such may advantageously rely on the fact that convenience stores are often sited or distributed based on convenience to the target population or demographic. Such may advantageously rely on pre-existing leases on storefronts or other retail locations to allow an extensive network of collection, charging and distribution machines 102 to be quickly developed in a city or region. Quickly achieving a large network which is geographically well distributed to serve a target population enhances the ability to depend on such a system and likely commercial success of such an effort. Providing a system in which locations of the collection, charging and distribution machines are provided to and can be easily found by users of the collection, charging and distribution machines also enhances the ability to depend on such a system and likely commercial success of such an effort. The ability to quickly provide locations of the collection, charging and distribution machines 102 to users as well as provide the ability for users to select and reserve portable electrical energy storage devices at selected collection, charging and distribution machines 102 is addressed herein.

The location 112 may include an electrical service 114 to receive electrical power from a generating station (not shown) for example via a grid 116. The electrical service 114 may, for example, include one or more of an electrical service meter 114a, a circuit panel (e.g., circuit breaker panel or fuse box) 114b, wiring 114c, and electrical outlet 114d. Where the location 112 is an existing retail or convenience store, the electrical service 114 may be an existing electrical service, so may be somewhat limited in rating (e.g., 120 volts, 240 volts, 220 volts, 230 volts, 15 amps).

Neither the operator of the retail location 112, nor the owner, distributor or operator of the collection, charging and distribution machine 102 may wish to bear the costs of upgrading the electrical service 114. Yet, quick charging is desired in order to maintain an adequate supply of portable electrical energy storage devices 106 available for use by end users. The ability to quickly charge while maintaining existing or otherwise limited rated electrical service is addressed in U.S. provisional patent application Ser. No. 61/511,900, entitled "APPARATUS, METHOD AND ARTICLE FOR COLLECTION, CHARGING AND DISTRIBUTING POWER STORAGE DEVICES, SUCH AS BATTERIES" and filed Jul. 26, 2011.

Optionally, the collection, charging and distribution machine 102 may include or be coupled to a source of renewable electrical power. For example, where installed in an outside location the collection, charging and distribution machine 102 may include an array of photovoltaic (PV) cells 118 to produce electrical power from solar insolation. Alternatively, the collection, charging and distribution machine 102 may be electrically coupled to a microturbine (e.g., wind turbine) or PV array positioned elsewhere at the location 112, for instance on a roof top or pole mounted at a top of a pole (not shown).

The collection, charging and distribution machine 102 may be communicatively coupled to one or more remotely located computer systems, such as back end or back office systems (only one shown) 120. The back end or back office systems 120 may collect data from and/or control a plurality of collection, charging and distribution machine 102 distributed about an area, such as a city. The communications may occur over one or more communications channels including one or more networks 122, or non-networked communications channels. Communications may be over one or more wired communications channels (e.g., twisted pair wiring, optical fiber), wireless communications channels (e.g., radio, microwave, satellite, 801.11 compliant). Networked communications channels may include one or more local area networks (LANs), wide area networks (WANs), extranets, intranets, or the Internet including the Worldwide Web portion of the Internet.

The collection, charging and distribution machine 102 may include a user interface 124. The user interface may include a variety of input/output (I/O) devices to allow an end user to interact with the collection, charging and distribution machine 102. Various I/O devices are called out and described in reference to FIG. 2, which follows.

Figure 2:
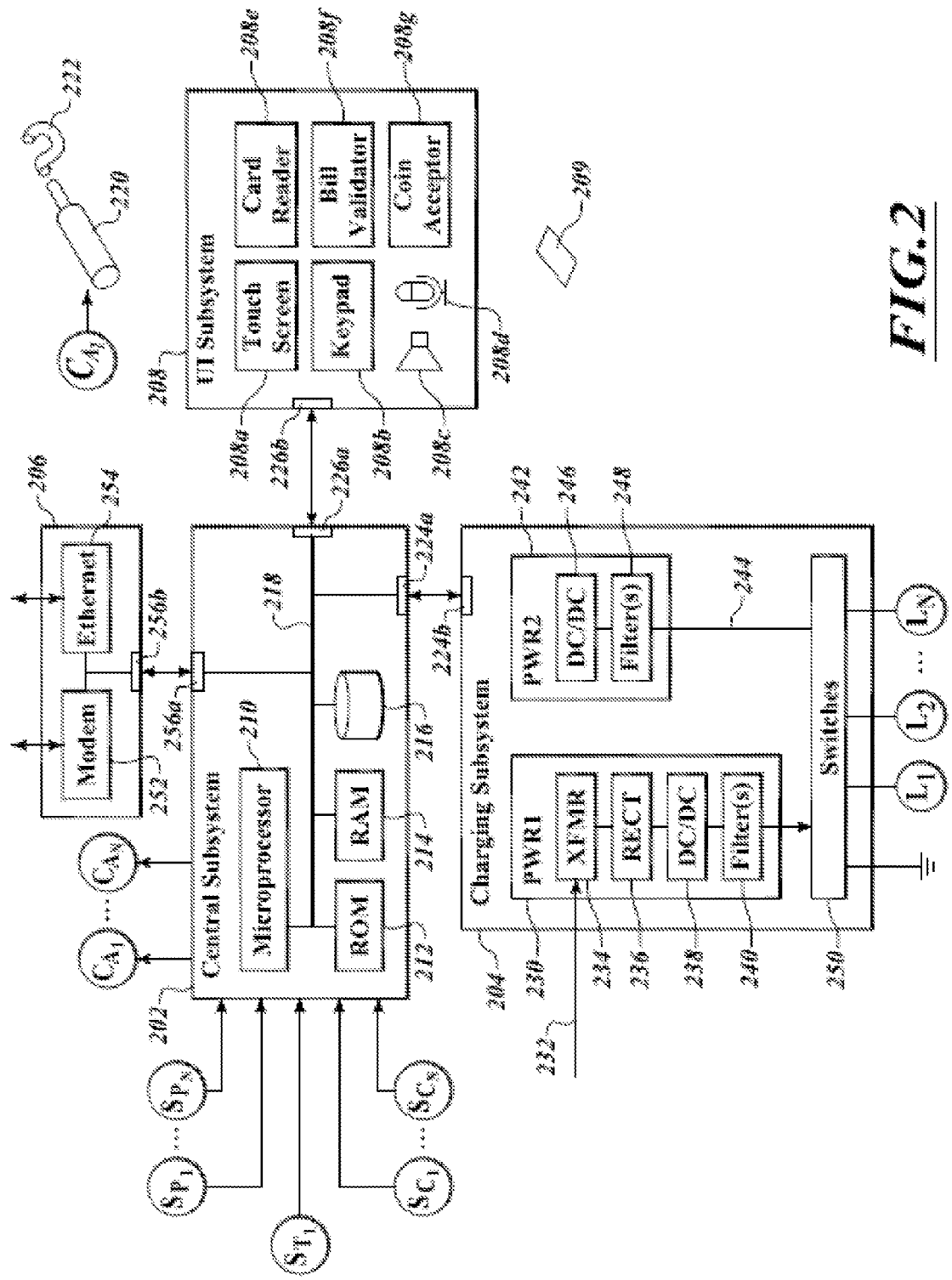
FIG. 2 is a block diagram of the collection, charging and distribution machine of FIG. 1, according to one non-limiting illustrated embodiment.

FIG. 2 shows the collection, charging and distribution machine 102 of FIG. 1, according to one illustrated embodiment.

The collection, charging and distribution machine 102 includes a control subsystem 202, a charging subsystem 204, a communications subsystem 206, and a user interface subsystem 208.

The control subsystem 202 includes a controller 210, for example a microprocessor, microcontroller, programmable logic controller (PLC), programmable gate array (PGA), application specific integrated circuit (ASIC) or another controller capable of receiving signals from various sensors, performing logical operations, and sending signals to various components. Typically, the controller 210 may take the form of a microprocessor (e.g., INTEL, AMD, ATOM). The control subsystem 202 may also include one or more non-transitory processor- or computer-readable storage media, for example read only memory (ROM) 212, random access memory (RAM) 214, and data store 216 (e.g., solid-state storage media such as flash memory or EEPROM, spinning storage media such as hard disk). The non-transitory processor- or computer-readable storage media 212, 214, 216 may be in addition to any non-transitory storage medium (e.g., registers) which is part of the controller 210. The control subsystem 202 may include one or more buses 218 (only one illustrated) coupling various components together, for example one or more power buses, instruction buses, data buses, etc.

As illustrated, the ROM 212, or some other one of the non-transitory processor- or computer-readable storage media 212, 214, 216, stores instructions and/or data or values for variables or parameters. The sets of data may take a variety of forms, for example a lookup table, a set of records in a database, etc. The instructions and sets of data or values are executable by the controller 110. Execution of the instructions and sets of data or values causes the controller 110 to perform specific acts to cause the collection, charging and distribution machine 102 to collect, charge, and distribute portable energy storage devices. Specific operation of the collection, charging and distribution machine 102 is described herein and also below with reference to various flow diagrams (FIGS. 14-16).

The controller 210 may use RAM 214 in a conventional fashion, for volatile storage of instructions, data, etc. The controller 210 may use data store 216 to log or retain information, for example telemetric information related to collection, charging and/or distribution or collection of the portable electric power storage devices 106 and/or operation of the collection, charging and distribution machine 102 itself. The instructions are executable by the controller 210 to control operation of the collection, charging and distribution machine 102 in response to end user or operator input, and using data or values for the variables or parameters.

The control subsystem 202 receives signals from various sensors and/or other components of the collection, charging and distribution machine 102 which include information that characterizes or is indicative of operation, status, or condition of such other components. Sensors are represented in FIG. 2 by the letter S appearing in a circle along with appropriate subscript letters.

For example, one or more position sensors $S_{P1}$-$S_{PN}$ may detect the presence or absence of portable electrical power storage device 106 at each of the receivers 104. The position sensors $S_{P1}$-$S_{PN}$ may take a variety of forms. For example, the position sensors $S_{P1}$-$S_{PN}$ may take the form of mechanical switches that are closed, or alternatively opened, in response to contact with a portion of a respective portable electrical power storage device 106 when the portable electrical power storage device 106 is inserted into the receiver 104. Also for example, the position sensors $S_{P1}$-$S_{PN}$ may take the form of optical switches (i.e., optical source and receiver) that are closed, or alternatively opened, in response to contact with a portion of a respective portable electrical power storage device 106 when the portable electrical power storage device 106 is inserted into the receiver 104. Also for example, the position sensors $S_{P1}$-$S_{PN}$ may take the form of electrical sensors or switches that are closed, or alternatively opened, in response to detecting a closed circuit condition created by contact with the terminals 110 of a respective portable electrical power storage device 106 when the portable electrical power storage device 106 is inserted into the receiver 104, or an open circuit condition that results from the lack of a respective portable electrical power storage device 106 in the receiver 104. These examples are intended to be non-limiting, and it is noted that any other structures and devices for detecting the presence/absence, the availability, or even the insertion of the portable electrical power storage devices 106 into receivers may be employed.

For example, one or more charge sensors $S_{C1}$-$S_{CN}$ may detect charge of the portable electrical power storage devices 106 at each of the receivers 104. Charge sensors $S_{C1}$-$S_{CN}$ may detect the amount of charge stored by the portable electrical power storage devices 106. Charge sensors $S_{C1}$-$S_{CN}$ may additionally detect an amount of charge and/or rate of charging being supplied to ones of the portable electrical power storage devices 106 at each of the receivers 104. Such may allow assessment of current (i.e., temporal) charge condition or status of each portable electrical power storage device 106, as well as allow feedback control over charging of same, including control over rate of charging. Charge sensors $S_{C1}$-$S_{CN}$ may include any variety of current and/or voltage sensors.

For example, one or more charge sensors $S_{T1}$ (only one shown) may detect or sense a temperature at the receivers 104 or in the ambient environment.

The control subsystem 202 provides signals to various actuators and/or other components responsive to control signals, which signals include information that characterizes or is indicative of an operation the component is to perform or a state or condition in which the components should enter. Control signals, actuators or other components responsive to control signals are represented in FIG. 2 by the letter C appearing in a circle along with appropriate subscript letters.

For example, one or more engine control signals $C_{A1}$-$C_{AN}$ may affect the operation of one or more actuators 220 (only one illustrated). For instance, a control signal $C_{A1}$ may cause movement of an actuator 220 between a first and a second position or change a magnetic field produced by the actuator 220. The actuator 220 may take any of a variety of forms, including but not limited to a solenoid, an electric motor such as a stepper motor, or an electromagnet. The actuator 220 may be coupled to operate a latch, lock or other retainer mechanism 222. The latch, lock or other retainer mechanism 222 may selectively secure or retain one or more portable electrical power storage devices 106 (FIG. 1) in the receiver 104 (FIG. 1). For instance, the latch, lock or other retainer mechanism 222 may physically couple to a complimentary structure that is part of a housing of the portable electrical power storage devices 106 (FIG. 1). Alternatively, the latch, lock or other retainer mechanism 222 may magnetically couple to a complimentary structure that is part of a housing of the portable electrical power storage devices 106 (FIG. 1). Also for instance, the latch, lock or other mechanism may open a receiver 104 (FIG. 1), or may allow a receiver 104 to be opened, to receive a partially or fully discharged portable electrical power storage device 106 for charging. For example, the actuator may open and/or close a door to the receiver 104 (FIG. 1), to selectively provide access to a portable electrical power storage device 106 (FIG. 1) received therein. Also for example, the actuator may open and/or close a latch or lock, allowing an end user to open and/or close a door to the receiver 104 (FIG. 1), to selectively provide access to a portable electrical power storage device 106 (FIG. 1) received therein.

The control subsystem 202 may include one or more ports 224a to provide control signals to one or more ports 224b of the charging subsystem 206. The ports 224a, 224b may provide bi-directional communications. The control subsystem 202 may include one or more ports 226a to provide control signals to one or more ports 226b of the user interface subsystem 208. The ports 226a, 226b may provide bi-directional communications.

The charging subsystem 102 includes various electrical and electronic components to charge portable electrical power storage devices 106 when positioned or received in the receivers 104. For example, the charging subsystem 102 may include one or more power buses or power bus bars, relays, contactors or other switches (e.g., insulated gate bipolar transistors or IGBTs, metal oxide semiconductor transistors or MOSFETs), rectifier bridge(s), current sensors, ground fault circuitry, etc. The electrical power is supplied via contacts that can take any of a variety of forms, for instance terminals, leads, posts, etc. The contacts allow electrical coupling of various components. Some possible implementations are illustrated in FIG. 2. Such is not intended to be exhaustive. Additional components may be employed while other components may be omitted.

The illustrated charging subsystem 102 includes a first power converter 230 that receives electrical power from the electrical service 114 (FIG. 1) via a line or cord 232. The power will typically be in the form of single, two or three phase AC electrical power. As such, the first power converter 230 may need to convert and otherwise condition the electrical power received via the electrical services 114 (FIG. 1), for example for rectifying an AC waveform to DC, transforming voltage, current, phase, as well as reducing transients and noise. Thus, the first power converter 230 may include a transformer 234, rectifier 236, DC/DC power converter 238, and filter(s) 240.

The transformer 234 may take the form of any variety of commercially available transformers with suitable ratings for handling the power received via the electrical service 114 (FIG. 1). Some embodiments may employ multiple transformers. The transformer 234 may advantageously provide galvanic isolation between the components of the collection, charging and distribution machine 102 and the grid 116 (FIG. 1). The rectifier 236 may take any of variety of forms, for example a full bridge diode rectifier or a switch mode rectifier. The rectifier 236 may be operated to transform AC electrical power to DC electrical power. The DC/DC power converter 238 may be any of a large variety of forms. For example, DC/DC power converter 238 may take the form a switch mode DC/DC power converter, for instance employing IGBTs or MOSFETs in a half or full bridge configuration, and may include one or more inductors. The DC/DC power converter 238 may have any number of topologies including a boost converter, buck converter, synchronous buck converter, buck-boost converter or fly-back converter. The filter(s) 240 may include one or more capacitors, resistors, Zener diodes or other elements to suppress voltage spikes, or to remove or reduce transients and/or noise.

The illustrated charging subsystem 102 may also receive electrical power from a renewable power source, for example the PV array 118 (FIG. 1). Such may be converted or conditioned by the first power converter 230, for example being supplied directly to the DC/DC power converter 238, bypassing the transformer 236 and/or rectifier 236. Alternatively, the illustrated charging subsystem 102 may include a dedicated power converter to convert or otherwise condition such electrical power.

The illustrated charging subsystem 102 may optionally include second power converter 242 that receives electrical power from one or more portable electrical power storage devices 106 (FIG. 1) via one or more lines 244, for charging other ones of the portable electrical power storage devices 106. As such, the second power converter 242 may need to convert and/or otherwise condition the electrical power received from portable electrical power storage devices 106, for example optionally transforming voltage or current, as well as reducing transients and noise. Thus, the second power converter 242 may optionally include a DC/DC power converter 246 and/or filter(s) 248. Various types of DC/DC power converters and filters are discussed above.

The illustrated charging subsystem 102 includes a plurality of switches 250 responsive to the control signals delivered via ports 224a, 224b from the control subsystem 202. The switches may be operable to selectively couple a first number or set of portable electrical power storage devices 106 to be charged from electrical power supplied by both the electrical service via the first power converter 230 and from electrical power supplied by a second number or set of portable electrical power storage devices 106. The first number or set of portable electrical power storage devices 106 may include a single portable electrical power storage device 106, two, or even more portable electrical power storage devices 106. The second number or set of portable electrical power storage devices 106 may include a single portable electrical power storage device 106, two, or even more portable electrical power storage devices 106. The portable electrical power storage devices 106 are represented in FIG. 2 as loads $L_1, L_2$-$L_N$.

The communications subsystem 206 may additionally include one or more communications modules or components which facilitate communications with the various components of a back end or back office system 120 (FIG. 1). The communications subsystem 206 may, for example, include one or more modems 252 or one or more Ethernet or other types of communications cards or components 254. A port 256a of the control subsystem 202 may communicatively couple the control subsystem 202 with a port 256b of the communications subsystem 206. The communications subsystem 206 may provide wired and/or wireless communications. The communications subsystem 206 may include one or more ports, wireless receivers, wireless transmitters or wireless transceivers to provide wireless signal paths to the various remote components or systems. The remote communications subsystem 206 may include one or more bridges or routers suitable to handle network traffic including switched packet type communications protocols (TCP/IP), Ethernet or other networking protocols.

The user interface system 208 includes one or more user input/output (I/O) components. For example, user interface system 208 may include a touch screen display 208a, operable to present information and a graphical user interface (GUI) to an end user and to receive indications of user selections. The user interface system 208 may include a keyboard or keypad 208b, and/or a cursor controller (e.g., mouse, trackball, trackpad) (not illustrated) to allow an end user to enter information and/or select user selectable icons in a GUI. The user interface system 208 may include a speaker 208c to provide aural messages to an end user and/or a microphone 208d to receive spoken user input such as spoken commands.

The user interface system 208 may include a card reader 208e to read information from card type media 209. The card reader 208e may take a variety of forms. For instance, the card reader 208e may take the form of, or include, a magnetic stripe reader for reading information encoded in a magnetic stripe carried by a card 209. For instance, the card reader 208e may take the form of, or include, a machine-readable symbol (e.g., barcode, matrix code) card reader for reading information encoded in a machine-readable symbol carried by a card 209. For instance, the card reader 208e may take the form of, or include, a smart card reader for reading information encoded in a non-transitory medium carried by a card 209. Such may, for instance, include media employing radio frequency identification (RFID) transponders or electronic payment chips (e.g., near filed communications (NFC) chips). Thus, the card reader 208e may be able to read information from a variety of card media 209, for instance credit cards, debit cards, gift cards, prepaid cards, as well as identification media such as drivers licenses.

The user interface system 208 may include a bill acceptor 208f and a validator and/or coin acceptor 208g to accept and validate cash payments. Such may be highly useful in servicing populations who lack access to credit. Bill acceptor and validator 208f and/or coin acceptor 208g may take any variety of forms, for example those that are currently commercially available and used in various vending machines and kiosks.

Figure 3:
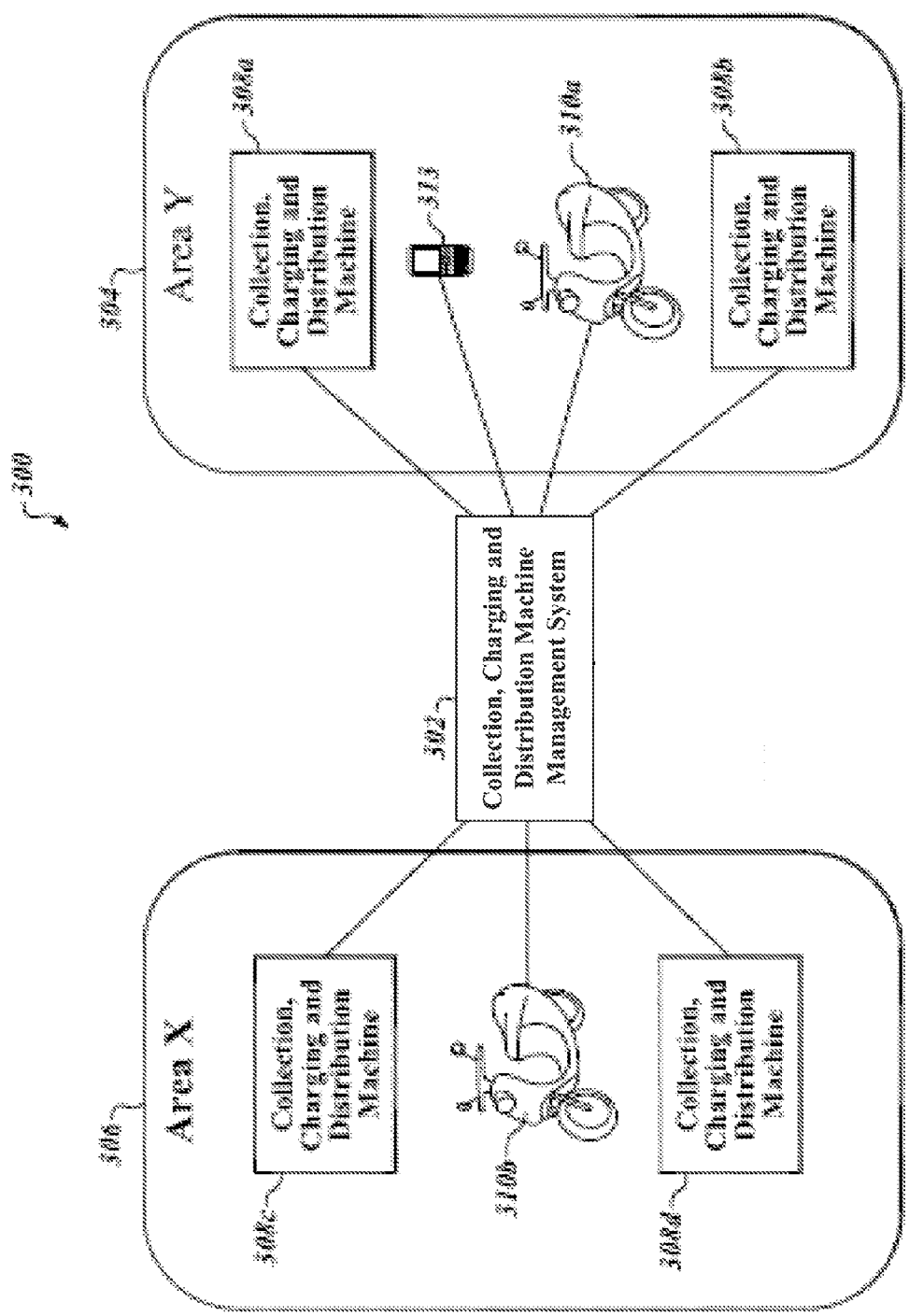
FIG. 3 is a block diagram of a system for providing locations of collection, charging and distribution machines, such as that of FIG. 1, according to one non-limiting illustrated embodiment.

FIG. 3 is a block diagram of a system 300 for providing locations of collection, charging and distribution machines, such as that of FIG. 1, according to one non-limiting illustrated embodiment.

Shown is a collection, charging and distribution machine management system 302 for providing locations of collection, charging and distribution machines, such as, for example, machines like the collection, charging and distribution machine 102 of FIG. 1. The collection, charging and distribution machine management system 302 also provides information regarding the availability of portable electrical energy storage devices for users of portable electrical energy storage devices 106 at each collection, charging and distribution machine 102, and in some embodiments, the types of portable electrical energy storage devices 106 available. In some embodiments, the collection, charging and distribution machine management system 302 may be the back end or back office system 120 shown in FIG. 1. In other embodiments, the collection, charging and distribution machine management system 302 may be part of or may be in operable communication with, the back end or back office system 120 shown in FIG. 1.

For illustrative purposes, shown are two example areas, Area X 306 and Area Y 304, which each contain one or more collection, charging and distribution machines and one or more electrically powered vehicles. As shown in FIG. 3, as an example, Area Y 306 includes collection, charging and distribution machine 308a, collection, charging and distribution machine 308b and vehicle 310a. For example, Area Y may be defined by a radius from vehicle 310a or from user mobile device 313 of a particular distance (e.g., 10 kilometers), defined by a particular driving time (e.g., 10 minutes) from vehicle 310a or mobile device 313 and/or defined by a particular driving distance from vehicle 310a or mobile device 313. The driving time and/or driving distance may be calculated based on the current location of the vehicle 310a and/or mobile device 313 and one or more of: the roads and driving routes available to the particular collection, charging and distribution machine from the current location of the vehicle 310a and/or mobile device 313, current traffic conditions, preferred routes of the user, historical driving routes of the user, the current direction the user is traveling, etc. Area X 304 includes collection, charging and distribution machine 308c, collection, charging and distribution machine 308d and vehicle 310b. For example, Area X may be defined by a radius from vehicle 310b of a particular distance and/or defined by a particular driving distance or driving time from vehicle 310b. In other embodiments, each area represents a different geographic location whose boundaries may be defined by any number of criteria including, but not limited to: property, neighborhood, district, municipality, city, population, county, state, province, country, road, water, longitudinal or latitudinal coordinates, boundaries or any other public, private, physical or political boundary. Also, each area may contain fewer or more collection, charging and distribution machines depending on the boundary constraints.

The collection, charging and distribution machine management system 302 is in operable communication with the collection, charging and distribution machines 308a, 308b, 308c and 308d, and one or more user mobile communication devices 313 (only one shown as an example), such that data may be exchanged between the collection, charging and distribution machine management system 302, the collection, charging and distribution machines 308a, 308b, 308c and 308d, and the user mobile communication device 313. This data may represent actual, expected or predicted availability of portable electrical energy storage devices 106 at one or more of the collection, charging and distribution machines. In some embodiments, an available portable electrical energy storage device 106z may be an operable and fully or nearly fully charged portable electrical energy storage device that has not yet been reserved. Also, the collection, charging and distribution machine management system 302, the collection, charging and distribution machines 308a, 308b, 308c and 308d, and the user mobile communication device 313 may, in some embodiments, additionally or instead be in operable communication directly with each other.

This communication between the various items, systems and entities of FIG. 3 is enabled by the various communications subsystems of these various items, systems and entities. For example, this communication may be enabled by the various communications subsystems of the distribution machines 308a, 308b, 308c and 308d, the collection, charging and distribution machine management system 302, the vehicles 310a and 310b, and the user mobile communications device 313. One or more of such communication subsystems may provide wired and/or wireless communications, e.g., cellular, local area network connections, and/or short range wireless connections (such as Bluetooth® wireless connections, etc.). The communications subsystems of the items in FIG. 3 may include one or more ports, wireless receivers, wireless transmitters or wireless transceivers to provide wireless signal paths to the various remote components or systems. The remote communications subsystems may include one or more bridges or routers suitable to handle network traffic including switched packet type communications protocols (TCP/IP), Ethernet or other networking protocols.

For example, the collection, charging and distribution machine management system 302 may receive an update from collection, charging and distribution machine 308c indicating the current inventory and/or availability of charged electrical energy storage devices at collection, charging and distribution machine 308c. In some embodiments, the collection, charging and distribution machine management system 302 may continually or periodically monitor the inventories of charged electrical energy storage devices of all or many of the collection, charging and distribution machines. Also, the collection, charging and distribution machines may continually or periodically provide updates to the collection, charging and distribution machine management system 302 regarding the inventory of charged electrical energy storage devices of the respective collection, charging and distribution machine. This information may be provided to mobile device 313, vehicle 310a, and/or vehicle 310b continuously, periodically, aperiodically and/or or in response to a request for such information from mobile device 313, vehicle 310a, and/or vehicle 310b. The locations of collection, charging and distribution machines having available portable electrical energy storage devices may then be provided to a respective user of the mobile device 313, vehicle 310a, and/or vehicle 310b.

For example, a map may be displayed on a display of the mobile device 313, vehicle 310a, and/or vehicle 310b on which locations of collection, charging and distribution machines within the respective area (e.g., area X or area Y) having available portable electrical energy storage devices are indicated, along with the current location of the respective mobile device 313, vehicle 310a, and/or vehicle 310b. Location data of the mobile device 313, vehicle 310a, and/or vehicle 310b may be determined by the charging and distribution machine management system 302 and/or the mobile device 313, vehicle 310a, and/or vehicle 310b based on a global positioning system (GPS) signal associated with the mobile device 313, vehicle 310a, and/or vehicle 310b or other location information regarding the mobile device 313, vehicle 310a, and/or vehicle 310b. In some embodiments, this location information may be communicated to and/or from the mobile device 313 and vehicle 310a, either of which may have received the location information based on the global positioning system (GPS) signal or from the collection, charging, and distribution machine management system. For example, this location information may be communicated to and/or from the mobile device 313 and vehicle 310a via a short range wireless signal such as a Bluetooth® signal or other short range wireless signal or other communication medium.

The user may then select a location indicated on the displayed map (e.g., via a touch screen or other interface enabling selection of the indicated locations) at which to reserve an available portable electrical energy storage device. This reservation is stored in a database of reservations maintained centrally by the collection, charging and distribution machine management system 302 and/or locally at the selected collection, charging and distribution machine. For example, the reservation may include a record in which an available portable electrical energy storage device or unique reservation number or code is associated with the user who reserved the portable electrical energy storage device, such as by a user identification or other user data communicated from the mobile device 313, vehicle 310a, and/or vehicle 310b to the collection, charging and distribution machine 102 or the collection, charging and distribution machine management system 302 when the reservation was being made. In some embodiments, each portable electrical energy storage device may have an identification code or number uniquely identifying the particular portable electrical energy storage device. This portable electrical energy storage device identification number or code may be associated with the user identification number or code in the reservation record. The number of available portable electrical energy storage devices available at the selected collection, charging and distribution machine location is then decreased by one by the collection, charging and distribution machine management system 302 and/or by the selected collection, charging and distribution machine.

The reservation may be for a limited time or have other restrictions. After the limited time elapses and the user has not removed the reserved portable electrical energy storage device at the selected collection, charging and distribution machine, the portable electrical energy storage device then becomes available and this available status is updated in the collection, charging and distribution machine management system 302 and/or the selected collection, charging and distribution machine system.

The collection, charging and distribution machine system may identify the user via the user interface of the collection, charging and distribution machine by the user inputting particular user credentials, a password, biometric data, the user identification number or code, and/or by the card reader 208e described above, etc. The collection, charging and distribution machine management system 302, a navigation system running on the mobile device 313 and/or a navigation system running on the vehicle 310a may then provide driving directions to the selected collection, charging and distribution machine such as on the displayed map or another map available to the user. Also, the locations of the collection, charging and distribution machines and associated information regarding available portable electrical energy storage devices need not be displayed on a map, but may be communicated and organized in any manner including in a list, as a group of selectable icons, etc., that indicates particular collection, charging and distribution machines have one or more available portable electrical energy storage devices.

In some instances, particular collection, charging and distribution machines may be further away from the user's current location than other collection, charging and distribution machines that perhaps are currently experiencing higher demand. Thus, the collection, charging and distribution machine management system 302 may communicate to the user a redeemable incentive for the user to exchange or return their portable electrical energy storage devices to one of the collection, charging and distribution machines that are further away from the user than other closer collection, charging and distribution machines that also have available portable electrical energy storage devices. For example, the incentive may be redeemable as a discount or credit on fees related to the use of one or more of the plurality of collection, charging and distribution machines. Also, users may be provided similar incentives to return or exchange electrical energy storage devices before they are depleted or almost depleted to head off or smooth out an anticipated spike in demand.

In some embodiments, various options and features regarding available portable electrical energy storage devices may be generated and made available to the user. For example, a user's historical route information may be utilized by the collection, charging and distribution machine management system 302 to anticipate which collection, charging and distribution machines the user may likely to want to visit, and availability of charged portable electrical energy storage devices at these particular collection, charging and distribution machines may be communicated to the user automatically as these portable electrical energy storage devices at these locations become available (e.g., by sending an alert to the user). The availability of charged portable electrical energy storage devices at these particular collection, charging and distribution machines may also or instead be highlighted or given special designations on the displayed map, or may be indicated on the displayed map instead of locations of other collection, charging and distribution machines at which portable electrical energy storage devices are available. The number and types of available portable electrical energy storage devices at each collection, charging and distribution machine location within the area may also be displayed. For example, the number of available high performance portable electrical energy storage devices and other types of portable electrical energy storage devices at each collection, charging and distribution machine may be communicated to the user. These various options may be selectable by the user via a mobile device 313, user interface on the vehicle 310a, or other computing device.

Figure 4:
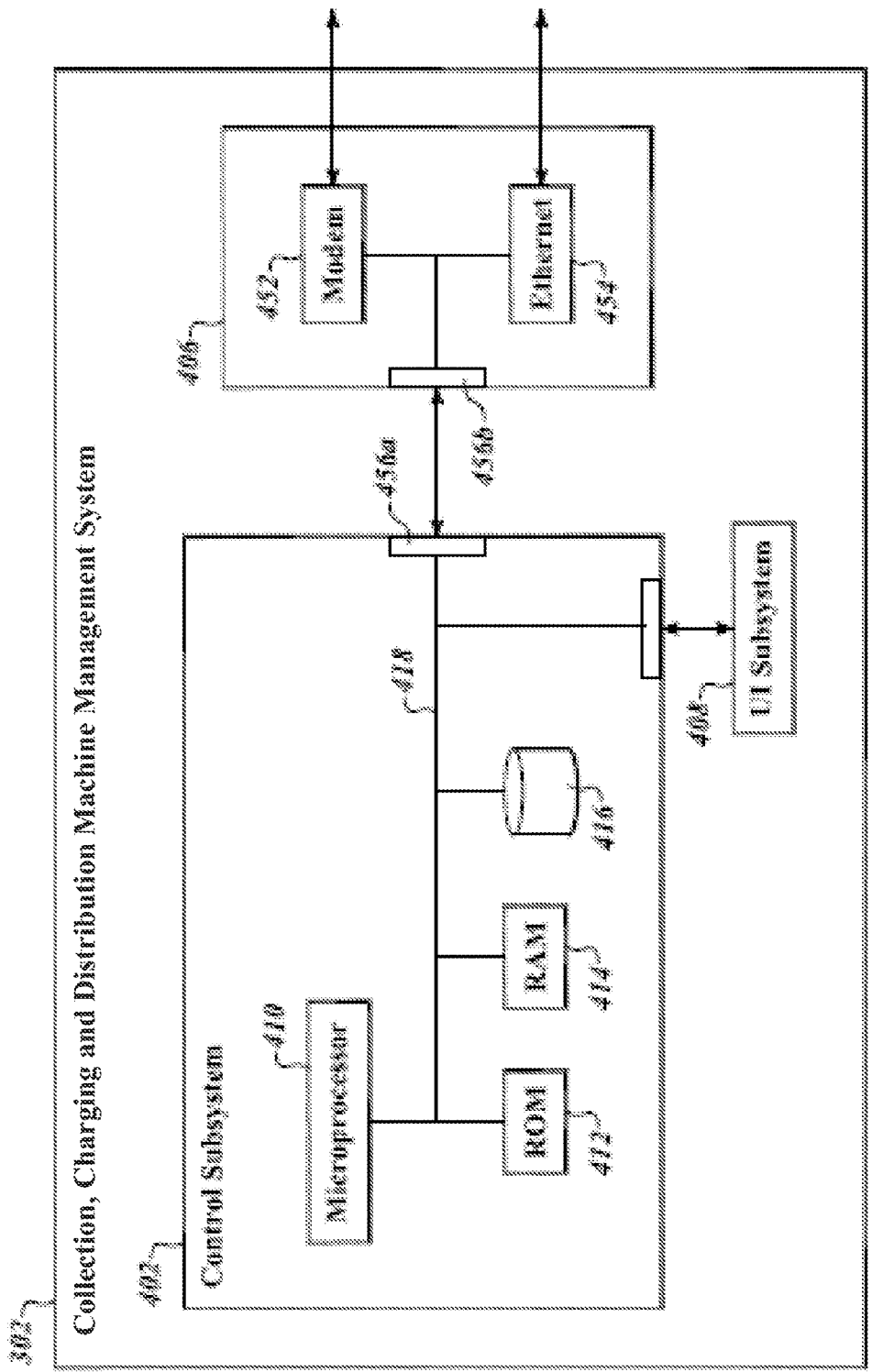
FIG. 4 is a schematic view of the collection, charging and distribution machine management system of FIG. 3, according to one non-limiting illustrated embodiment.

FIG. 4 is a schematic view of the collection, charging and distribution machine management system 302 of FIG. 3, according to one non-limiting illustrated embodiment.

The collection, charging and distribution machine management system 302 includes a control subsystem 402, a communications subsystem 406, and a user interface subsystem 408. However, such a system and associated functionalities may also be present in the vehicle (e.g., vehicle 310a of FIG. 3) and/or the user mobile device 313 also shown in FIG. 3.

The control subsystem 402 includes a controller 410, for example a microprocessor, microcontroller, programmable logic controller (PLC), programmable gate array (PGA), application specific integrated circuit (ASIC) or another controller capable of receiving signals from various sensors, performing logical operations, and sending signals to various components. Typically, the controller 410 may take the form of a microprocessor (e.g., INTEL, AMD, ATOM). The control subsystem 402 may also include one or more non-transitory processor- or computer-readable storage media, for example read only memory (ROM) 412, random access memory (RAM) 414, and data store 416 (e.g., solid-state storage media such as flash memory or EEPROM, spinning storage media such as hard disk). The non-transitory processor- or computer-readable storage media 412, 414, 416 may be in addition to any non-transitory storage medium (e.g., registers) which is part of the controller 410. The control subsystem 402 may include one or more buses 418 (only one illustrated) coupling various components together, for example one or more power buses, instruction buses, data buses, etc.

As illustrated, the ROM 412, or some other one of the non-transitory processor- or computer-readable storage media 412, 414, 416, stores instructions and/or data or values for variables or parameters. The sets of data may take a variety of forms, for example a lookup table, a set of records in a database, etc. The instructions and sets of data or values are executable by the controller 410. Execution of the instructions and sets of data or values causes the controller 410 to perform specific acts to cause the collection, charging and distribution machine management system 302 receive, send and/or to provide information to various external devices regarding locations of collection, charging and distribution machines that have available charged portable electrical energy storage devices for use. Execution of the instructions and sets of data or values may also cause the controller 410 to perform specific acts to cause the collection, charging and distribution machine management system 302 receive, send, store, maintain, update and otherwise manage information regarding reservations of various portable electrical energy storage devices of various collection, charging and distribution machines. Specific operation of the collection, charging and distribution machine management system 302 is described herein and also below with reference to various flow diagrams (FIGS. 6-9).

The controller 410 may use RAM 414 in a conventional fashion, for volatile storage of instructions, data, etc. The controller 410 may use data store 416 to log or retain information, for example, information regarding portable electrical energy storage device availability and reservations of portable electrical energy storage devices, information regarding relative demand of charged portable electrical energy storage devices between geographical locations, information regarding historic usage patterns of one or more of the plurality of collection, charging and distribution machines, information regarding user vehicle locations and telematic and/or telemetric user vehicle information, information regarding portable electrical energy storage device charge capacity, information regarding route information of users of one or more of the charged portable electrical energy storage devices, information regarding energy storage devices, telemetric information related to collection, charging and/or distribution of collection of the portable electric power storage devices 106 and/or operation of the collection, charging and distribution machine management system 302 itself. The instructions are executable by the controller 410 to control operation of the collection, charging and distribution machine management system 302 in response to input from remote systems such as collection, charging and distribution machines, collection, charging and distribution machine service systems, user mobile devices, user vehicles, and end user or operator input, and using data or values for the variables or parameters.

The control subsystem 402 may also receive signals from various sensors and/or components of a collection, charging and distribution machine, such as the collection, charging and distribution machine 102 of FIG. 1 via the communications subsystem 206 of collection, charging and distribution machine 102. This information may include information that characterizes or is indicative of operation, status, or condition of such components. Sensors are represented in FIG. 2 by the letter S appearing in a circle along with appropriate subscript letters. For example, one or more position sensors $S_{P1}$-$S_{PN}$ may detect the presence or absence of portable electrical power storage device 106 at each of the receivers 104. This information may be communicated to the control subsystem 402. Also, one or more charge sensors $S_{C1}$-$S_{CN}$ may detect a charge level charge of the portable electrical power storage devices 106 at each of the receivers 104. This information may also be communicated to the control subsystem 402.

The communications subsystem 406 may include one or more communications modules or components which facilities communications with the various components of a collection, charging and distribution machine, such as collection, charging and distribution machine 112 of FIG. 1 and also the various components of the collection, charging and distribution machines 308a, 308b, 308c and 308d of FIG. 3, the portable electrical energy storage device transfer service 312 and the one or more user mobile communication devices 313, such that data may be exchanged between the collection, charging and distribution machine management system 302, the collection, charging and distribution machines 308a, 308b, 308c and 308d, and the user mobile communication device 313. The communications subsystem 406 may, for example, include one or more modems 452 or one or more Ethernet or other types of communications cards or components 454. A port 456a of the control subsystem 402 may communicatively couple the control subsystem 402 with a port 456b of the communications subsystem 406. The communications subsystem 406 may provide wired and/or wireless communications. The communications subsystem 406 may include one or more ports, wireless receivers, wireless transmitters or wireless transceivers to provide wireless signal paths to the various remote components or systems. The remote communications subsystem 406 may include one or more bridges or routers suitable to handle network traffic including switched packet type communications protocols (TCP/IP), Ethernet or other networking protocols.

The user interface system 408 includes one or more user input/output (I/O) components (not illustrated). For example, user interface system 408 may include a touch screen display operable to present information and a graphical user interface (GUI) to a user and to receive indications of user selections. The user interface system 408 may include a keyboard or keypad, and/or a cursor controller (e.g., mouse, trackball, trackpad, and/or touch screen) to allow a user to enter information and/or select user selectable icons in a GUI.

Figure 5:
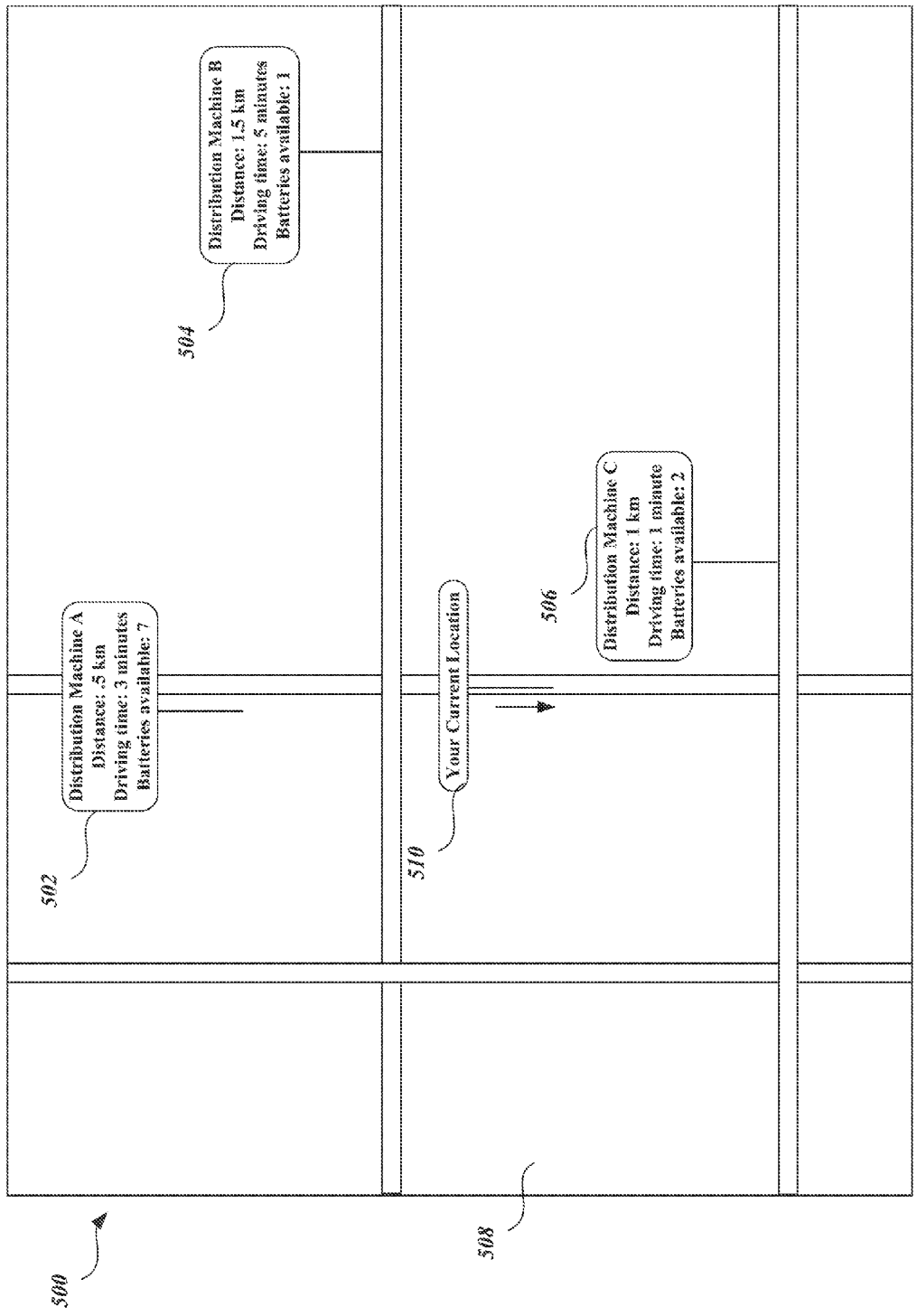
FIG. 5 is an example user interface indicating locations of collection, charging and distribution machines, according to one non-limiting illustrated embodiment

FIG. 5 is an example user interface 500 indicating locations of collection, charging and distribution machines, according to one non-limiting illustrated embodiment. For example, the user interface 500 may be a user interface of the user mobile device 313 or vehicle 310a shown in FIG. 3. Shown are three selectable icons on a map 608 representing locations of collection, charging and distribution machines (collection, charging and distribution machine A 502, collection, charging and distribution machine B 504 and collection, charging and distribution machine C 506) within a particular distance (e.g., a 10 kilometer radius) from user mobile device 313 or vehicle 310a. Also shown on the map 508 of the user interface 500 is an icon representing the current location 510 of the user mobile device 313 or vehicle 310a. Each selectable icon representing locations of collection, charging and distribution machines (collection, charging and distribution machine A 502, collection, charging and distribution machine B 504 and collection, charging and distribution machine C 506) also displays the driving distance from the current location 510 of the mobile device 313 or vehicle 310a; the driving time from the current location 610 of the mobile device 313 or vehicle 310a; and the number of available portable electrical energy storage devices at the collection, charging and distribution machine corresponding to the selectable icon. The user may select the particular selectable icon representing locations of collection, charging and distribution machines (collection, charging and distribution machine A 502, collection, charging and distribution machine B 504 and collection, charging and distribution machine C 506) to reserve an available portable electrical energy storage device at the collection, charging and distribution machine corresponding to the selected icon. The user interface may then display a confirmation that the portable electrical energy storage device has been reserved, the time remaining until the reservation expires and directions from the user's current location 510 to the collection, charging and distribution machine corresponding to the selected icon.

Figure 6:
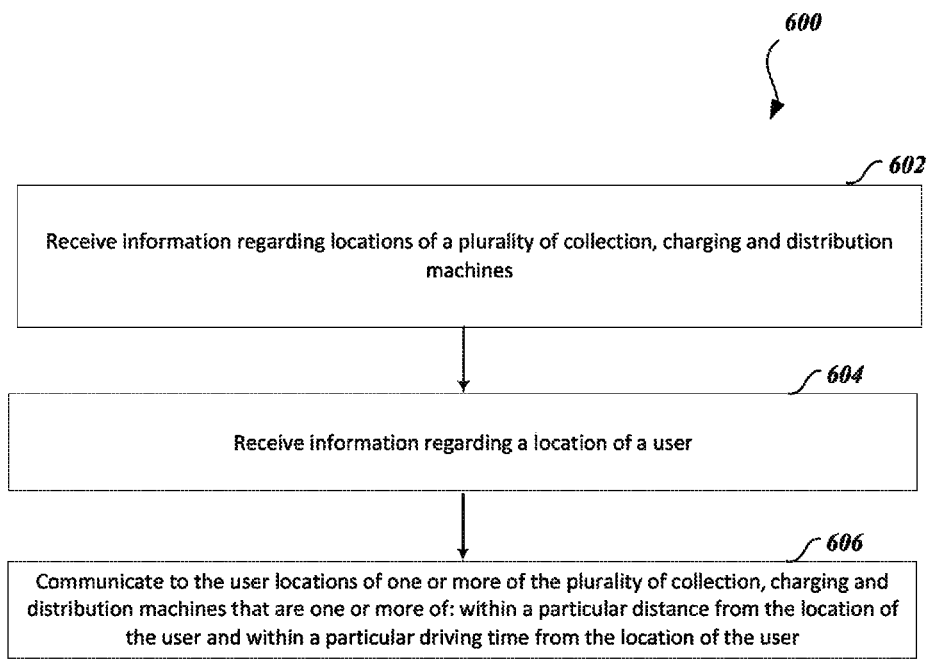
FIG. 6 is a flow diagram showing a high level method of providing locations of collection, charging and distribution machines, according to one non-limiting illustrated embodiment.

FIG. 6 shows a high level method 600 of providing locations of collection, charging and distribution machines, according to one non-limiting illustrated embodiment.

At 602, the collection, charging and distribution machine management system 302, user mobile device 313 or vehicle 310a receives information regarding locations of a plurality of collection, charging and distribution machines. For example, this information may include location data for the collection, charging and distribution machines via a GPS signal. Also included may be additional information regarding the quantity of available portable electrical energy storage devices at each collection, charging and distribution machine, the charge levels of the portable electrical energy storage devices, the types of portable electrical energy storage devices available and the availability of the portable electrical energy storage devices for use.

At 604, the collection, charging and distribution machine management system 302, user mobile device 313 or vehicle 310a receives information regarding a location of a user (e.g., GPS coordinates, or other data identifying the location of the user mobile device 313 or vehicle 310a).

At 606, the collection, charging and distribution machine management system 302, user mobile device 313 or vehicle 310a communicates to the user locations of one or more of the plurality of collection, charging and distribution machines that are one or more of: within a particular distance from the location of the user and within a particular driving time from the location of the user. For example, the collection, charging and distribution machine management system 302 may communicate the locations of the one or more of the plurality of collection, charging and distribution machines to the user mobile device 313, which will then display these locations on a map displayed on the user mobile device 313 including the user's current location (e.g., such as that shown on map 508 in FIG. 5).

Figure 7:
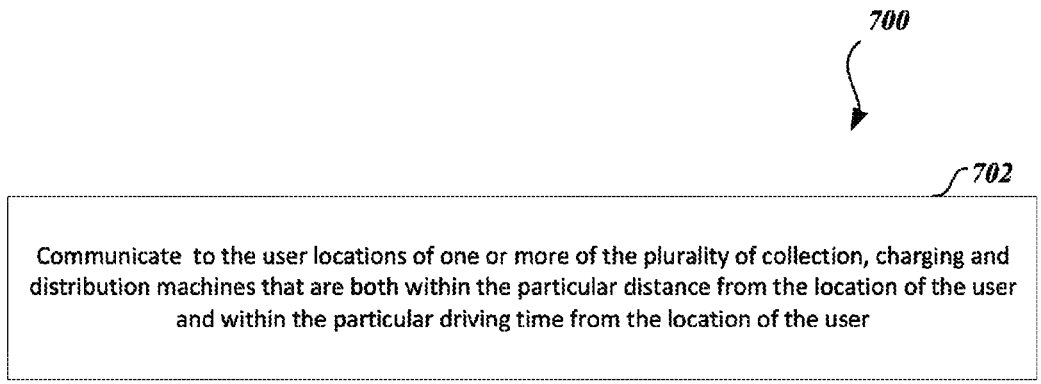
FIG. 7 is a flow diagram showing a low level method of providing locations of collection, charging and distribution machines useful in the method of FIG. 6, according to one non-limiting illustrated embodiment.

FIG. 7 shows a low level method 700 of providing locations of collection, charging and distribution machines useful in the method of FIG. 6, according to one non-limiting illustrated embodiment.

At 702, the collection, charging and distribution machine management system 302, user mobile device 313 or vehicle 310a communicate to the user locations of one or more of the plurality of collection, charging and distribution machines that are both within the particular distance from the location of the user and within the particular driving time from the location of the user. For example, in one embodiment only collection, charging and distribution machines that are both within a 10 km radius of the user mobile device 313 and within 10 minutes driving time form the user device 313 are displayed on a map of the user interface of the user mobile device 313.

Figure 8:
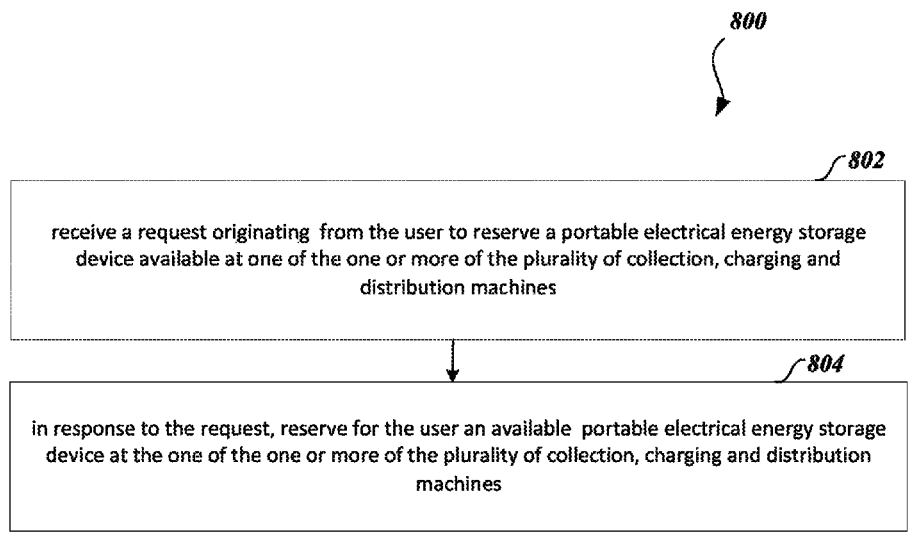
FIG. 8 is a flow diagram showing a high level method of reserving a portable electrical energy storage device, according to one non-limiting illustrated embodiment, useful in the method of FIG. 5 and FIG. 6.

FIG. 8 shows a high level method 800 of reserving a portable electrical energy storage device, according to one non-limiting illustrated embodiment, useful in the method of FIG. 5 and FIG. 6.

At 802, the collection, charging and distribution machine management system 302, user mobile device 313 or vehicle 310a receives a request originating from the user to reserve a portable electrical energy storage device available at one of the one or more of the plurality of collection, charging and distribution machines. For example, this may be a request activated or triggered by a selection of one of the three selectable icons on the map 508 representing locations of collection, charging and distribution machines (collection, charging and distribution machine A 502, collection, charging and distribution machine B 504 and collection, charging and distribution machine C 506) within a particular distance from user mobile device 313 or vehicle 310a as shown in FIG. 5.

At 804, in response to the request, the collection, charging and distribution machine management system 302, user mobile device 313 or vehicle 310a reserves for the user an available portable electrical energy storage device at the selected one of the one or more of the plurality of collection, charging and distribution machines. For example, this request may be sent from the user mobile device 313 to the collection, charging and distribution machine management system 302 for the collection, charging and distribution machine management system 302 to update the reservation system maintained by the collection, charging and distribution machine management system 302 to indicate the reservation.

Figure 9:
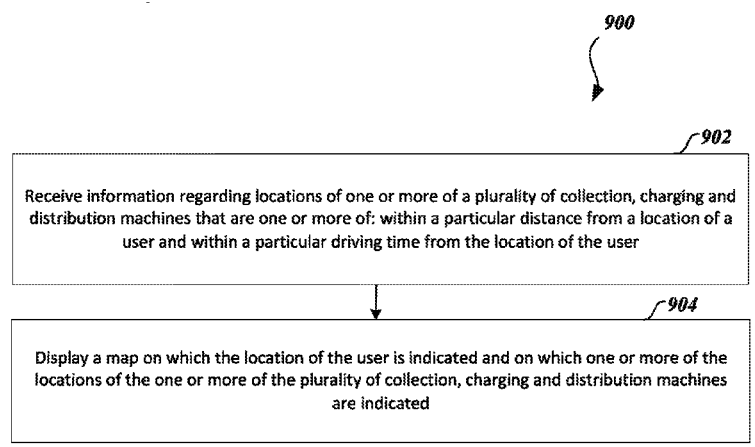
FIG. 9 is a flow diagram showing a high level method of providing a user interface for providing locations of collection, charging and distribution machines, according to one non-limiting illustrated embodiment.

FIG. 9 shows a high level method 900 of providing a user interface for providing locations of collection, charging and distribution machines, according to one non-limiting illustrated embodiment.

At 902, the mobile device 13 or vehicle 310a receives information regarding locations of one or more of a plurality of collection, charging and distribution machines that are one or more of: within a particular distance from a location of a user and within a particular driving time from the location of the user.

At 904, the mobile device 313 or vehicle 310a displays a map on which the location of the user is indicated and on which one or more of the locations of the one or more of the plurality of collection, charging and distribution machines are indicated. For example, shown in FIG. 5 is a map 508 on which the location of the user is indicated and on which one or more of the locations of the one or more of the plurality of collection, charging and distribution machines are indicated. However, other types of maps, driving directions and types of indications of the locations of the one or more of the plurality of collection, charging and distribution machines may be used.

The various methods described herein may include additional acts, omit some acts, and/or may perform the acts in a different order than set out in the various flow diagrams.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and/or firmware would be well within the skill of one of ordinary skill in the art in light of the teachings of this disclosure.

When logic is implemented as software and stored in memory, logic or information can be stored on any non-transitory computer-readable medium for use by or in connection with any processor-related system or method. In the context of this disclosure, a memory is a nontransitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any physical element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to: U.S. provisional patent application Ser. No. 61/511,900 entitled "APPARATUS, METHOD AND ARTICLE FOR COLLECTION, CHARGING AND DISTRIBUTING POWER STORAGE DEVICES, SUCH AS BATTERIES" and filed Jul. 26, 2011, U.S. provisional patent application Ser. No. 61/647,936 entitled "APPARATUS, METHOD AND ARTICLE FOR COLLECTION, CHARGING AND DISTRIBUTING POWER STORAGE DEVICES, SUCH AS BATTERIES" and filed May 16, 2012, U.S. provisional patent application Ser. No. 61/534,753 entitled "APPARATUS, METHOD AND ARTICLE FOR REDISTRIBUTING POWER STORAGE DEVICES, SUCH AS BATTERIES, BETWEEN COLLECTION, CHARGING AND DISTRIBUTION MACHINES" and filed Sep. 14, 2011, U.S. provisional patent application Ser. No. 61/534,761 entitled "APPARATUS, METHOD AND ARTICLE FOR AUTHENTICATION, SECURITY AND CONTROL OF POWER STORAGE DEVICES SUCH AS BATTERIES" and filed Sep. 14, 2011, U.S. provisional patent application Ser. No. 61/534,772 entitled "APPARATUS, METHOD AND ARTICLE FOR AUTHENTICATION, SECURITY AND CONTROL OF POWER STORAGE DEVICES, SUCH AS BATTERIES, BASED ON USER PROFILES" and filed Sep. 14, 2011, U.S. provisional patent application Ser. No. 61/511,887 entitled "THERMAL MANAGEMENT OF COMPONENTS IN ELECTRIC MOTOR DRIVE VEHICLES" and filed Jul. 26, 2011, U.S. provisional patent application Ser. No. 61/647,941 entitled "THERMAL MANAGEMENT OF COMPONENTS IN ELECTRIC MOTOR DRIVE VEHICLES" and filed May 16, 2012, U.S. provisional patent application Ser. No. 61/511,880 entitled "DYNAMICALLY LIMITING VEHICLE OPERATION FOR BEST EFFORT ECONOMY" and filed Jul. 26, 2011, U.S. provisional patent application Ser. No. 61/557,170 entitled "APPARATUS, METHOD, AND ARTICLE FOR PHYSICAL SECURITY OF POWER STORAGE DEVICES IN VEHICLES" and filed Nov. 8, 2011, U.S. provisional patent application Ser. No. 61/581,566 entitled APPARATUS, METHOD AND ARTICLE FOR A POWER STORAGE DEVICE COMPARTMENT' and filed Dec. 29, 2011, U.S. provisional patent application Ser. No. 61/601,404 entitled "APPARATUS, METHOD AND ARTICLE FOR PROVIDING VEHICLE DIAGNOSTIC DATA" and filed Feb. 21, 2012, U.S. provisional patent application Ser. No. 61/601,949 entitled "APPARATUS, METHOD AND ARTICLE FOR PROVIDING LOCATIONS OF POWER STORAGE DEVICE COLLECTION, CHARGING AND DISTRIBUTION MACHINES" and filed Feb. 22, 2012, and U.S. provisional patent application Ser. No. 61/601,953 entitled "APPARATUS, METHOD AND ARTICLE FOR PROVIDING INFORMATION REGARDING AVAILABILITY OF POWER STORAGE DEVICES AT A POWER STORAGE DEVICE COLLECTION, CHARGING AND DISTRIBUTION MACHINE" and filed Feb. 22, 2012, U.S. application Ser. No. 13/559,314, filed on Jul. 26, 2012, naming Hok-Sum Horace Luke, Matthew Whiting Taylor and Huang-Cheng Hung as inventors and entitled "APPARATUS, METHOD AND ARTICLE FOR COLLECTION, CHARGING AND DISTRIBUTING POWER STORAGE DEVICES, SUCH AS BATTERIES", U.S. application Ser. No. 13/559,038, filed on Jul. 26, 2012, naming Hok-Sum Horace Luke and Matthew Whiting Taylor as inventors and entitled "APPARATUS, METHOD AND ARTICLE FOR AUTHENTICATION, SECURITY AND CONTROL OF POWER STORAGE DEVICES SUCH AS BATTERIES" U.S. application Ser. No. 13/559, 264, filed on Jul. 26, 2012 naming Hok-Sum Horace Luke and Matthew Whiting Taylor as inventors and entitled "DYNAMICALLY LIMITING VEHICLE OPERATION FOR BEST EFFORT ECONOMY", U.S. application Ser. No. 13/559,054, filed on Jul. 26, 2012, naming Matthew Whiting Taylor, Yi-Tsung Wu, Hok-Sum Horace Luke and Huang-Cheng Hung as inventors and entitled "APPARATUS, METHOD, AND ARTICLE FOR PHYSICAL SECURITY OF POWER STORAGE DEVICES IN VEHICLES", U.S. application Ser. No. 13/559,390 filed on Jul. 26, 2012, naming Ching Chen, Hok-Sum Horace Luke, Matthew Whiting Taylor, Yi-Tsung Wu as inventors and entitled "APPARATUS, METHOD AND ARTICLE FOR PROVIDING VEHICLE DIAGNOSTIC DATA", U.S. application Ser. No 13/559,343, filed on Jul. 26, 2012, naming Yi-Tsung Wu, Matthew Whiting Taylor, Hok-Sum Horace Luke and Jung-Hsiu Chen as inventors and entitled "APPARATUS, METHOD AND ARTICLE FOR PROVIDING INFORMATION REGARDING AVAILABILITY OF POWER STORAGE DEVICES AT A POWER STORAGE DEVICE COLLECTION, CHARGING AND DISTRIBUTION MACHINE", and U.S. application Ser. No. 13/559,064, filed on Jul. 26, 2012, naming Hok-Sum Horace Luke, Yi-Tsung Wu, Jung-Hsiu Chen, Yulin Wu, Chien Ming Huang, TsungTing Chan, Shen-Chi Chen and Feng Kai Yang as inventors and entitled "APPARATUS, METHOD AND ARTICLE FOR RESERVING POWER STORAGE DEVICES AT RESERVING POWER STORAGE DEVICE COLLECTION, CHARGING AND DISTRIBUTION MACHINES" are incorporated herein by reference, in their entirety. Aspects of the embodiments can be modified, if necessary, to employ systems, circuits and concepts of the various patents, applications and publications to provide yet further embodiments.

While generally discussed in the environment and context of collection, charging and distribution of portable electrical energy storage devices for use with personal transportation vehicle such as all-electric scooters and/or motorbikes, the teachings herein can be applied in a wide variety of other environments, including other vehicular as well as non-vehicular environments.

The above description of illustrated embodiments, including what is described in the Abstract of the Disclosure, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A method of operating a system for providing locations of collection, charging and distribution machines for collection, charging and distribution of portable electrical energy storage devices, the method comprising:

receiving, by the system for providing locations of collection, charging and distribution machines, information regarding locations of a plurality of collection, charging and distribution machines for collection, charging and distribution of portable electrical energy storage devices, wherein the system for providing locations of collection, charging and distribution machines includes at least one computer processor coupled to a memory;

receiving, by the system for providing locations of collection, charging and distribution machines, information regarding a location of a user;

determining, by a computer processor of the system for providing locations of collection, charging and distribution machines, based on the information regarding the locations, locations of a group of collection, charging and distribution machines within the plurality of collection, charging and distribution machines that are one or more of:

within a particular distance from the location of the user and within a particular driving time from the location of the user; and communicating to the user, by a computer processor of the system for providing locations of collection, charging and distribution machines, the determined locations of the group of collection, charging and distribution machines within the plurality of collection, charging and distribution machines that are one or more of: within a particular distance from the location of the user and within a particular driving time from the location of the user, wherein the determined locations of the group of plurality of collection, charging and distribution machines are selectable by the user for the user to proceed to a selected one of the determined locations of the group of plurality of collection, charging and distribution machines.

2. The method of claim 1 wherein the particular distance is within approximately a ten kilometer radius from the location of the user.

3. The method of claim 1 wherein the driving time is approximately fifteen minutes.

4. The method of claim 1 wherein the communicating to the user the determined locations of the group of the plurality of collection, charging and distribution machines includes communicating to a mobile device of the user locations of one or more of the plurality of collection, charging and distribution machines that are both within the particular distance from the location of the user and within the particular driving time from the location of the user.

5. The method of claim 1 further comprising communicating to a mobile device of the user how many portable electrical energy storage devices are available at each collection, charging and distribution machine of the group of collection, charging and distribution machines.

6. The method of claim 1 further comprising:
    receiving a request originating from the user to reserve a portable electrical energy storage device available at one of the group of collection, charging and distribution machines; and
    in response to the request, reserving for the user an available portable electrical energy storage device at the one of the group of plurality of collection, charging and distribution machines.

7. The method of claim 1 further comprising:
    communicating to the user how many portable electrical energy storage devices are available at each of the group of plurality of collection, charging and distribution machines; and
    communicating to the user types of portable electrical energy storage devices that are available at each of the group of plurality of collection, charging and distribution machines.

8. The method of claim 1 wherein the determining, based on the information regarding the locations of the plurality of collection, charging and distribution machines, is based on one or more of: historical driving routes of the user, the current direction the user is traveling.

9. The method of claim 6 wherein the available portable electrical energy storage device is reserved for a limited amount of time for the user.

10. The method of claim 6 wherein the reserving for the user an available portable electrical energy storage device includes decreasing a stored value indicative of how many portable electrical energy storage devices are available at the one of the group of plurality of collection, charging and distribution machines.

11. The method of claim 9 wherein the limited amount of time is based on one or more of: a distance of the one of the group of plurality of collection, charging and distribution machines at which the available portable electrical energy storage device is reserved from the location of the user and a driving time from the location of the user to the one of the group of collection, charging and distribution machines at which the available portable electrical energy storage device is reserved.

12. The method of claim 9 wherein the limited amount of time is approximately fifteen minutes.

13. The method of claim 12 further comprising:
    receiving a request originating from the user to reserve a portable electrical energy storage device of a particular type of the types of portable electrical energy storage devices that are available at the each of the group of plurality of collection, charging and distribution machines; and
    in response to the request, reserving for the user an available portable electrical energy storage device of the particular type at the one of the group of plurality of collection, charging and distribution machines.

14. A method of operating a system for providing locations of collection, charging and distribution machines for collection, charging and distribution of portable electrical energy storage devices, the method comprising:
    receiving, by the system for providing locations of collection, charging and distribution machines, information regarding locations of a plurality of collection, charging and distribution machines for collection, charging and distribution of portable electrical energy storage devices, wherein the system for providing locations of collection, charging and distribution machines includes at least one computer processor coupled to a memory;
    receiving, by the system for providing locations of collection, charging and distribution machines, information regarding a location of a user;
    determining, by the system for providing locations of collection, charging and distribution machines, locations of one or more the collection, charging and distribution machines to communicate to the user;
    communicating to the user, by the system for providing locations of collection, charging and distribution machines, an incentive for the user to exchange or return a portable electrical energy storage device of the user to the determined one or more of the collection, charging and distribution machines that are further away from the user than one or more other closer collection, charging and distribution machines of the collection, charging and distribution machines that also have available portable electrical energy storage devices.

15. The method of claim 14 wherein the determining, by the system for providing locations of collection, charging and distribution machines, locations of one or more the collection, charging and distribution machines to communicate to the user includes selecting locations of one or more the collection, charging and distribution machines to communicate to the user to head off or smooth out an anticipated spike in demand for portable electrical energy storage devices at one or more of the collection, charging and distribution machines.

16. The method of claim 14 wherein the determining, by the system for providing locations of collection, charging and distribution machines, locations of one or more the collection, charging and distribution machines to communicate to the user is based on relative demand of charged portable electrical energy storage devices at one or more of the collection, charging and distribution machines.

17. The method of claim 14 wherein the incentive for the user to exchange or return a portable electrical energy storage device of the user to the determined one or more of the collection, charging and distribution machines that are further away from the user than one or more other closer collection, charging and distribution machines of the collection, charging and distribution machines that also have available portable electrical energy storage devices is an incentive for the user to exchange or return a portable electrical energy storage device of the user to one or more of the collection, charging and distribution machines that are currently experiencing less demand than the closer collection, charging and distribution machines.

18. The method of claim 14 wherein the one or more other closer collection, charging and distribution machines that also have available portable electrical energy storage devices are currently experiencing higher demand than the determined one or more of the collection, charging and distribution machines that are further away from the user.

19. The method of claim 14 wherein the incentive is redeemable as a discount or credit on fees related to the use of one or more of the collection, charging and distribution machines.

* * * * *